US010164793B2

(12) United States Patent
Chandhoke et al.

(10) Patent No.: US 10,164,793 B2
(45) Date of Patent: *Dec. 25, 2018

(54) SYSTEM AND METHOD FOR INTEROPERABILITY BETWEEN MULTIPLE NETWORKS

(71) Applicant: NATIONAL INSTRUMENTS CORPORATION, Austin, TX (US)

(72) Inventors: Sundeep Chandhoke, Austin, TX (US); Rodney W. Cummings, Austin, TX (US); Changzhe Gao, Shanghai (CN); Brian Keith Odom, Georgetown, TX (US)

(73) Assignee: NATIONAL INSTRUMENTS CORPORATION, Austin, TX (US)

( * ) Notice: Subject to any disclaimer, the term of this patent is extended or adjusted under 35 U.S.C. 154(b) by 158 days.

This patent is subject to a terminal disclaimer.

(21) Appl. No.: 14/511,863

(22) Filed: Oct. 10, 2014

(65) Prior Publication Data

US 2015/0103831 A1    Apr. 16, 2015

Related U.S. Application Data

(63) Continuation-in-part of application No. 14/054,227, filed on Oct. 15, 2013, now Pat. No. 9,137,044.

(51) Int. Cl.
*H04L 12/721* (2013.01)
*H04L 12/46* (2006.01)
(Continued)

(52) U.S. Cl.
CPC ............ *H04L 12/4625* (2013.01); *H04L 7/02* (2013.01); *H04L 12/40097* (2013.01);
(Continued)

(58) Field of Classification Search
None
See application file for complete search history.

(56) References Cited

U.S. PATENT DOCUMENTS

| 7,457,243 B2 | 11/2008 | Meggers et al. |
| 2004/0170198 A1* | 9/2004 | Meggers ............... H04L 47/822 370/514 |

FOREIGN PATENT DOCUMENTS

| CN | 102 096 405 A | 6/2011 |
| WO | WO 2002/025988 A1 | 3/2002 |

(Continued)

OTHER PUBLICATIONS

Patricia Thaler, Norman Finn, Don Fedyk, Glenn Parsons, Eric Gray; "Media Access Control Bridges and Virtual Bridged Local Area Networks" IEEE 802.1Q—Tutorial; Mar. 10, 2013 (77 pages).

(Continued)

*Primary Examiner* — Yemane Mesfin
*Assistant Examiner* — Jeff Banthrongsack
(74) *Attorney, Agent, or Firm* — Meyertons Hood Kivlin Kowert & Goetzel, P.C.; Jeffrey C. Hood; Brian E. Moore

(57) ABSTRACT

Systems and methods for interoperating between real time networks. Systems may include a plurality of ports and switch circuitry coupled to the plurality of ports. At least one port may be coupled to a first real time network carrying first traffic. One or more other ports may be coupled to a second real time network carrying second traffic. Switch circuitry may route packets between the first real time network and the one or more second real time networks based on a mapping. Routing information may be inserted in packets routed from the one or more second real time networks to the first real time network and routing information may be removed from the packets routed from the first real time network to the one or more second real time networks.

(Continued)

Packets may be routed based on the mapping to distinct queues for the first and second traffic.

20 Claims, 19 Drawing Sheets

(51) Int. Cl.
*H04L 7/02* (2006.01)
*H04L 12/40* (2006.01)
*H04L 12/931* (2013.01)
H04L 12/853 (2013.01)
H04L 12/715 (2013.01)

(52) U.S. Cl.
CPC .......... *H04L 49/206* (2013.01); *H04L 49/351* (2013.01); *H04L 45/04* (2013.01); *H04L 47/2416* (2013.01)

(56) References Cited

FOREIGN PATENT DOCUMENTS

| | | | |
|---|---|---|---|
| WO | WO 0225988 A1 * | 3/2002 | ............. H04L 12/56 |
| WO | WO 0225988 A1 * | 3/2002 | ......... H04L 12/5602 |

OTHER PUBLICATIONS

International Search Report for Application No. PCT/US2014/060311, dated Jan. 27, 2015; 5 pages.

\* cited by examiner

SYSTEM AND METHOD FOR INTEROPERABILITY BETWEEN MULTIPLE NETWORKS

CONTINUATION AND PRIORITY DATA

This application is a Continuation-In-Part of U.S. patent application Ser. No. 14/054,227, titled "System and Method for Interoperability Between Multiple Networks", filed Oct. 15, 2013, whose inventors are Sundeep Chandhoke, Rodney W. Cummings, Changzhe Gao, and Brian Keith Odom, and which is hereby incorporated by reference in its entirety as though fully and completely set forth herein.

FIELD OF THE INVENTION

The present invention relates to the field of time-sensitive (TS) networks, and more particularly to systems and methods for interoperability between networks, including managing the configuration of virtual local area network (VLAN) tags and data flow paths between real time networks with differing protocols, synchronization of clocks between networks, and/or scheduling data egress.

DESCRIPTION OF THE RELATED ART

In the industrial or embedded application field multiple real-time Ethernet implementations are available. Although similar in function, each implementation differs enough from the others that they are inoperable with each other. For example, PROFINET, Ethernet for Control Automation Technology (EtherCAT), Ethernet Industrial Protocol (Ethernet/IP), and Ethernet Powerlink all use the same Ethernet physical layer but are not interoperable amongst themselves. Additionally, these real-time Ethernet implementations cannot connect to standard IEEE 802.1 switches because the implementation of the media access control (MAC) layer used by each is customized to support its own proprietary protocol. Thus, since there is a multitude of existing deployments of real-time Ethernet based protocols, there is a need to define how these existing proprietary technologies can coexist and interoperate with standard IEEE 802.1 Ethernet technologies.

For example, the features that add real time data transfer support to standard Ethernet under IEEE 802.1 are collectively called Time Sensitive (TS) Networking. These features define stream reservation and time based scheduling in IEEE 802.1 in Ethernet switches. One the one hand, stream reservation guarantees bandwidth for real-time/time-sensitive streams, e.g., packets, end to end. On the other hand, time-based scheduling allows configuration of "windows of time" when only specific packets are allowed to egress a switch. These "windows of time" may be coordinated with transmission of time-sensitive packets (TS packets), by endpoints to minimize the age of a data stream, i.e., the latency of the data stream, as it passes through the network. Use of such "windows of time" may also bound or limit the maximum latency of the stream from the producer to the consumers such that a precise schedule may be determined.

TS networking is based on Virtual Local Area Network (VLAN) techniques. A VLAN is a distinct isolated broadcast domain. VLANs are partitioned out of local area networks (LANs) and can only pass data between each other via a router or routers. Additionally, VLAN allows a switched network to be logically segmented on an organizational basis. In other words, the network can be segmented by functions or applications rather than on a physical or geographical basis. A TS network predefines specific VLAN tags which allow identification of a TS packet as it is routed through a LAN.

A TS network interface controller (NIC) supports TS networking features via multiple queues. The queues segregate LAN traffic based on VLAN tags. However, as mentioned above, prior art real-time network devices typically implement a custom MAC which is not IEEE 802.1 compliant, and thus, not compatible with TS networks. Therefore, there is a need for a solution to allow interoperability between TS networks and prior art real-time networks, including the need to synchronize clocks between networks and/or the need to schedule data egress.

SUMMARY OF THE INVENTION

Various embodiments of systems and methods for interoperability between networks, including managing the configuration of virtual local area network (VLAN) tags and data flow paths between real time networks carrying different traffic, synchronization of clocks between networks, and scheduling data egress are presented below.

In one embodiment, a system for interoperating between real time networks may include a plurality of ports and switch circuitry coupled to the plurality of ports. At least one port may be coupled to a first real time network carrying first traffic. The first traffic may include first real time traffic and best effort traffic. One or more other ports may be coupled to one or more second real time networks carrying second traffic. The second traffic may include only second real time traffic. The switch circuitry may be configured with a mapping that specifies data routing between the plurality of ports and may accordingly route packets between the first real time network and the one or more second real time networks based on the mapping, thereby maintaining real time behavior between (or of) the first real time traffic and the second real time traffic. The switch circuitry may insert routing information in packets routed from the one or more second real time networks to the first real time network and may remove routing information from the packets routed from the first real time network to the one or more second real time networks. Further, the switch circuitry may route packets based on the mapping to distinct queues for the first traffic and the second traffic for processing by an application executing on at least one device.

In another embodiment, a system for interoperating between real time networks may include a network switch. The network switch may include switch circuitry, at least one port coupled to a first real time network carrying first traffic, and one or more additional, other, ports coupled respectively to one or more second real time networks carrying second traffic. Similar to above, the first traffic may include first real time traffic and best effort traffic, and the second traffic may include only second real time traffic. The switch circuitry may be coupled to the ports and configured with a mapping that specifies data routing between the ports. The switch circuitry may be configured to route packets between the first real time network and the one or more second real time networks based on the mapping in order to maintain real time behavior between (or of) the first real time traffic and the second real time traffic. During operation, the switch circuitry may insert routing information in packets routed from the one or more second real time networks to the first real time network and may remove routing information from the packets routed from the first real time network to the one or more second real time networks.

The system may also include a first device coupled to the network switch. An application may execute on the first device and the first device may include at least two first queue pairs for the first traffic and one or more respective second queue pairs for the second traffic for the one or more second real time networks. The switch circuitry may be configured to route packets, based on the mapping, to one or more queues of the first queue pairs and to one or more queues of the respective second queue pairs for processing by the application executing on the first.

Exemplary embodiments may also include configuration and operation of the switch circuitry, per embodiments of the above techniques.

In further embodiments, the first device may be configured to time stamp ingress and egress of packets to/from the first queue pairs and the second queue pairs, and the application may correlate clock synchronization information of the first real time network and the one or more second real time networks based on the time stamps.

Additionally, in some embodiments the switch circuitry may include one or more functional units configured to perform the routing of packets between the first real time network and the one or more second real time networks, the inserting routing information, the removing routing information, and the routing packets to the first queue pairs and the second queue pairs.

In one embodiment, a network node may include the network switch and the first device. The network node may be configured as a bridge between the first real time network and at least one of the one or more second real time networks.

In one embodiment, a system for synchronizing real time networks may include a first device located on a first real time network. The device may include a functional unit, a port coupled to the functional unit, and a plurality of output queues, coupled to the functional unit and the port, and configured for segregation of network packets based on a mapping of one or more additional real time networks to respective output queues. The functional unit may be configured to, for each of the one or more additional real time networks, generate synchronization packets based on a master clock. The packets (e.g., network packets) may be usable by a network timekeeper (e.g., master clock of the network) of the (respective) additional real time network to synchronize the (respective) additional real time network to the master clock. Additionally, the functional unit may be configured to store the synchronization packets in a respective output queue based on the mapping and send the synchronization packets to the network timekeeper of the additional real time network via the port. Exemplary embodiments may include configuration and operation of the functional unit, per embodiments of the above techniques.

In further embodiments, the functional unit, the port, and the plurality of output queues may be included in a first device on a first real time network that is separate and distinct from the one or more additional real time networks. Thus, the first device may be comprised in a network node of the first real time network and the network node may include a network switch. Additionally, or alternatively, the master clock may be external to the first real time network. In one embodiment, the master clock may be a network time keeper of one of the one or more additional real time networks. In another embodiment, the master clock may be a network master clock of the first real time network and may be included in a network switch of the first real time network. In one embodiment, the master clock may be synchronized to a global clock external to the one or more additional real time networks.

In some embodiments, the system may include a clock, coupled to the functional unit and synchronized to the master clock, and a time stamp unit coupled to the functional unit and the clock. In such embodiments, the functional unit may be configured to use the time stamp unit to generate time stamps for the synchronization packets in accordance with the clock.

In certain embodiments, the functional unit may be configured to, for each of the one or more additional real time networks, egress the synchronization packets via the respective output queue based on a specified egress period and the specified egress period may specify a time window and frequency for egressing the synchronization packets.

In one embodiment, a network switch for scheduled data egress may include switch circuitry, a plurality of ports coupled to the switch circuitry and a plurality of queues coupled to the switch circuitry and the plurality of ports. Each port may be associated with a respective set of routing information for network packets and each port may be configured with a respective set of egress periods. Additionally, each network packet may have respective routing information and a type that specifies a respective egress period. Each queue may be associated with a respective network packet type and a port of the plurality of ports.

The switch circuitry may be configured to receive one or more network packets non-deterministically from a network node of a real time network and deterministically route each network packet based on the routing information and type of the network packet. Additionally, to route each network packet, the switch circuitry may be configured to determine a port of the plurality of ports based on the routing information of the network packet, and determine an egress period for the network packet based on the type of the network packet. Further, the switch circuitry may be configured to store the network packet in a queue coupled to the port based on the egress period if the network packet cannot currently be egressed, and to provide the network packet from the port during the egress period, thereby deterministically egressing the network packet. Exemplary embodiments may include configuration and operation of the switch circuitry, per embodiments of the above techniques.

In one embodiment, configuring the switch circuitry to deterministically route the network packets configures the network switch to offload the scheduling of the network packets from the network node to the network switch.

In another embodiment, the switch circuitry, in order to determine if the current packet may be egressed, may be configured to determine that a respective time window for egress of the network packet is closed, determine that there is already a queued network packet of the same type stored in the queue for egress, or determine that the port is currently egressing a network packet.

In one embodiment, the switch circuitry may receive a group of two or more network packets at substantially the same time. In such embodiments, each egress period may specify a respective time window and frequency for egressing network packets and the respective time window of the determined egress period allows egress of only one of the two or more network packets. In certain embodiments, each egress period may specify a respective time window and frequency for egressing network packets wherein the switch circuitry may be configured to determine a quantity of the two or more network packets to egress during the determined egress period and configure the respective time window to allow the egress of the quantity during the determined egress period.

In another embodiment, the switch circuitry may include one or more functional units and the one or more functional units may be configured to perform the determining a port, the determining an egress period, the storing the network packet, and the egressing the network packet.

In some embodiments, all data transfers within a real time network may be scheduled in such a way as to minimize latency. Such scheduling may enable coordinated transfer times on a bus to minimize collisions in the network switch(es) (where such collisions could cause queuing delays, and thus increase latency). To achieve this, in one embodiment, a global schedule may be generated that provides time-based transmission schedules to nodes and time-window configuration to network switches. The transmission time for a network packet on a node may be calculated by taking cable propagation time and internal node and switch transmission delays into account. This may enable the network packet to travel from a sending node to a receiving node, transiting through each switch at the exact time when the switch's time-based window is "open". Thus the transmission time between a sending node and a receiving node may be minimized. To integrate real time networks that are not interoperable with each other, the global time-based schedule may be extended to include the network packets transmitted between the various real time networks. The systems and methods described above, including the synchronization of clocks between real time networks may aid in implementing and maintaining the global time-based schedule.

BRIEF DESCRIPTION OF THE DRAWINGS

A better understanding of the present invention can be obtained when the following detailed description of the preferred embodiment is considered in conjunction with the following drawings, in which.

Figure 1:
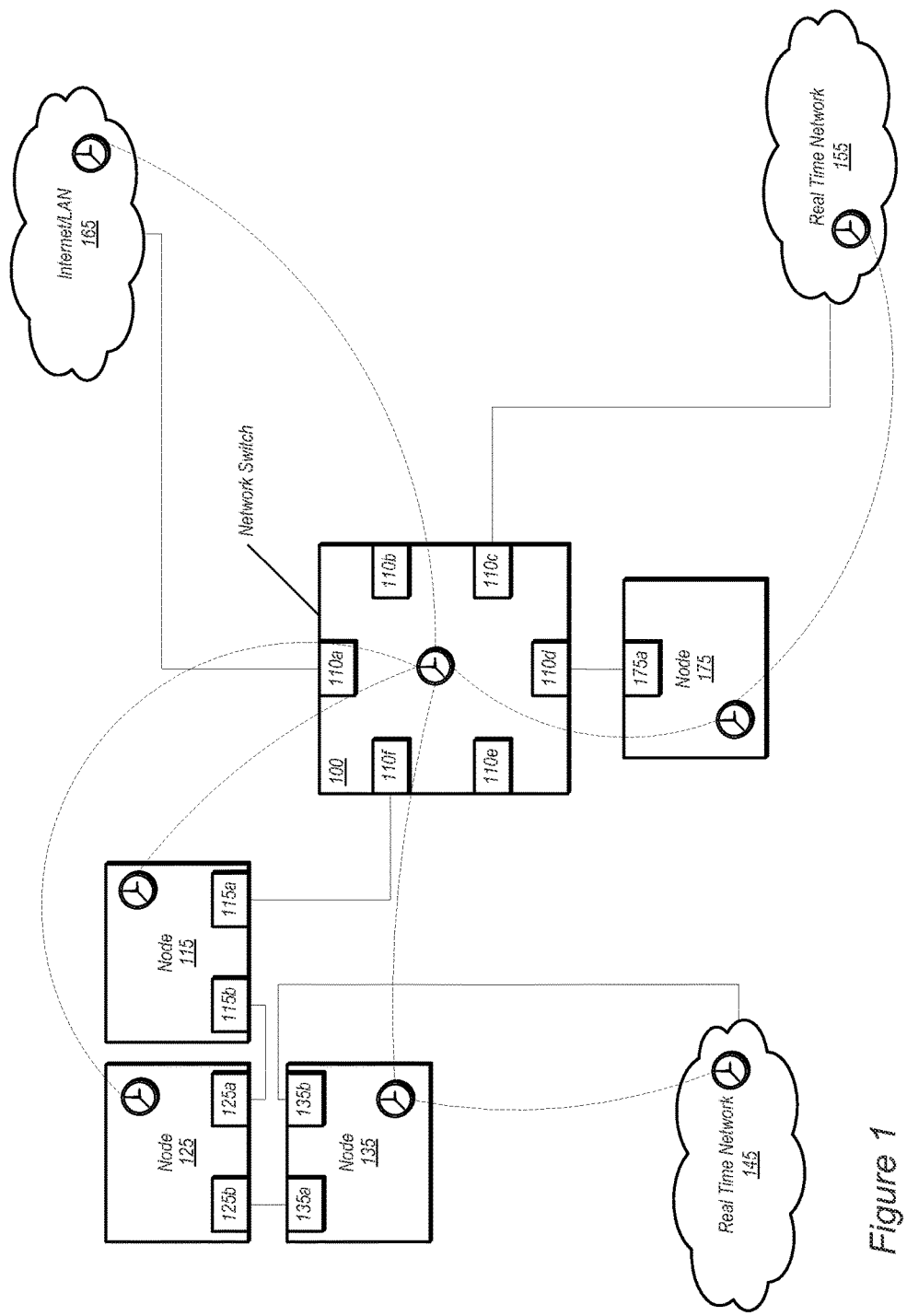
FIG. 1 is an exemplary block diagram of a real-time network according to embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following reference is hereby incorporated by reference in its entirety as though fully and completely set forth herein:

(6888-57801) U.S. patent application Ser. No. 14/054,227, titled "System and Method for Interoperability Between Multiple Networks", filed Oct. 15, 2013.

(6888-58001) U.S. patent application Ser. No. 14/054,443, titled "System and Method for Synchronizing a Master Clock Between Networks", filed Oct. 15, 2013.

(6888-58401) U.S. patent application Ser. No. 14/054,566, titled "Time-Sensitive Switch for Scheduled Data Egress", filed Oct. 15, 2013.

Terms

The following is a glossary of terms used in the present application:

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Internet Protocol (IP)—refers to the networking model and a set of protocols for communication used for networks such as the Internet.

Transmission Control Protocol (TCP)—refers to a core protocol of the internet protocol suite and provides delivery of a stream of octets between programs running on computers connected to a local area network, intranet, or the public Internet.

Ethernet—refers to a family of computer networking technologies for local area networks (LANs) as standardized in IEEE 802.3.

Local Area Network (LAN)—refers to a computer network that interconnects computers in a limited geographical area such as an office building or office complex.

Virtual Local Area Network (VLAN)—refers to a computer network that is logically segmented on an organizational basis, in other words, segmentation is based on functions or applications rather than on a physical or geographic basis as is the case with LANs.

Media Access Control (MAC) Layer—refers to the sublayer of a multi-layer computer network model which provides addressing and channel access control mechanisms that enable communication between multiple network nodes that share a common medium, such as Ethernet. MAC layer acts as an interface between the logical link control sublayer and the network's physical (PHY) layer.

Time-Sensitive (TS) Network—refers to networks adhering to the IEEE 802.1 standard for real-time data transfer.

Time-Sensitive (TS) Packet—refers to specific packets of data routed through a TS network that contain time-sensitive data. May include packets from a non-IEEE 802.1 compliant real-time network with a VLAN tag inserted using embodiments of the present invention.

Isochronous—refers generally to events that occur regularly, or in other words, at equal time intervals.

Asynchronous—refers generally to events that occur irregularly, or in other words, at unscheduled and intermittent time intervals.

FIG. 1—Exemplary Real-Time Network

FIG. 1 illustrates an exemplary block diagram of a real-time network according to embodiments. The network switch 100 may be configured in accordance with various embodiments of the present invention as described below in more detail. Additionally, network nodes, such as network nodes 115, 125, 135, and 175 may be configured according to various embodiments as described below in more detail.

As FIG. 1 shows, in one embodiment, the network switch 100 may include a plurality of ports, e.g., 110a to 110f, coupled to a functional unit and switch circuitry. The term functional unit is used in its broadest sense and refers to various elements or combinations of elements, such as, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof. In certain embodiments the functional unit may be included in switch circuitry. Additionally, in some embodiments, the switch circuitry may include additional functional units.

In certain embodiments, the network switch may be included in a system for interoperating between real-time networks with differing protocols, such as a time-sensitive network as defined by IEEE 802.1 and one or more prior art real-time networks, such as PROFINET, which uses standards such as TCP/IP and Ethernet along with a mechanism for real time and isochronous real time communication, EtherCAT, which is an open high performance Ethernet-based fieldbus system, Ethernet/IP, which is designed for use in process control and other industrial automation applications, Ethernet Powerlink, which is a deterministic real-time protocol for standard Ethernet, among others. Thus, as shown, network switch 100 may allow for interoperation between real time networks 145 and 155.

In such embodiments, a first port, such as port 110c, of the plurality of ports 110a to 110f, may be configured to couple to a real time network, such as real time network 155. Note that real time network 155 may carry traffic including only real time traffic. Thus, for example, real time network 155 may be a proprietary real-time Ethernet implementation such PROFINET, EtherCAT, Ethernet/IP, or Ethernet Powerlink, among others. Additionally, a second port of the network switch 100, such as ports 110d or 110f, may be coupled to a node of another real time network, such as nodes 175 and 115. Note that nodes 175 and 115 may be included in a real time network that carries traffic including both real time and best effort traffic, such as an IEEE 802.1 compliant network. In some embodiments, switch circuitry may be coupled to the plurality of ports of switch 100 and may be configured with a mapping that specifies data routing between the plurality of ports. In one embodiment, the switch circuitry may be configured to route packets between the real time networks, such as real time networks 115 and 155, based on the mapping. In such embodiments, the mapping and routing may maintain the real time behavior between the real time networks. Further, the switch circuitry may insert routing information in packets routed from real time network 155 to real time network 115 and may remove routing information from the packets routed from network 115 to network 155.

In some embodiments, each port of network switch 100 may be associated with a respective set of routing information for network packets. In such embodiments, each port may be configured with a respective set of egress periods and each network packet may have respective routing information and a type that may specify a respective egress period. Further, a plurality of queues may be coupled to the plurality of ports and the switch circuitry of network switch 100 and each queue may be associated with a respective network packet type and a port of the plurality of ports. Accordingly, the switch circuitry may be configured to receive one or more network packets non-deterministically from a network node of a real time network and deterministically route each network packet based on the routing information and type of the network packet. Additionally, to route each network packet, the switch circuitry may be configured to determine a port of the plurality of ports based on the routing information of the network packet and determine an egress period for the network packet based on the type of the network packet. It should be noted that if the network packet cannot currently be egressed, the switch circuitry may be configured to store the network packet in a queue coupled to the port based on the egress period and provide the network packet from the port during the egress period to deterministically egressing the network packet.

In some embodiments, a network node, e.g., network node 135 or 175, may include a network interface controller (NIC). In other embodiments, a network node, e.g., network node 115 or 125, may include a functional unit, a port coupled to the functional unit, and a plurality of output queues, coupled to the functional unit and the port. The output queues may be configured for segregation of network packets based on a mapping of additional real time networks to respective output queues. Further, the functional unit may configured to, for each of the additional real time networks, generate synchronization packets that may be based on a master clock and may be usable by a network timekeeper of the additional real time network to synchronize the additional real time network to the master clock. Additionally, the functional unit may be configured to store the synchronization packets in a respective output queue based on the mapping and send the synchronization packets to the network timekeeper of the additional real time network via the port.

Figure 2:
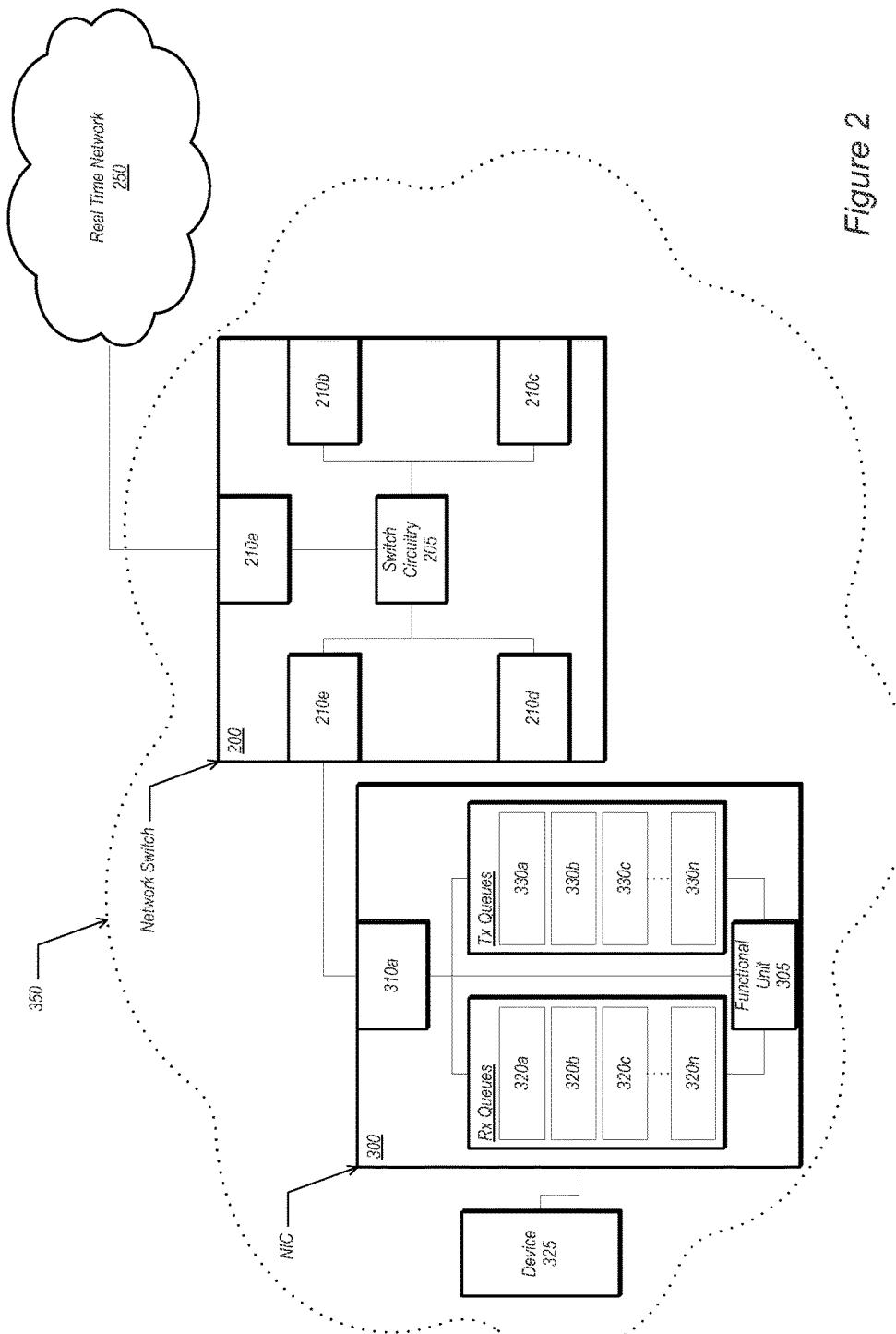
FIG. 2 is an exemplary block diagram of a system for allowing interoperability between real-time networks according to embodiments.
Figure 3:
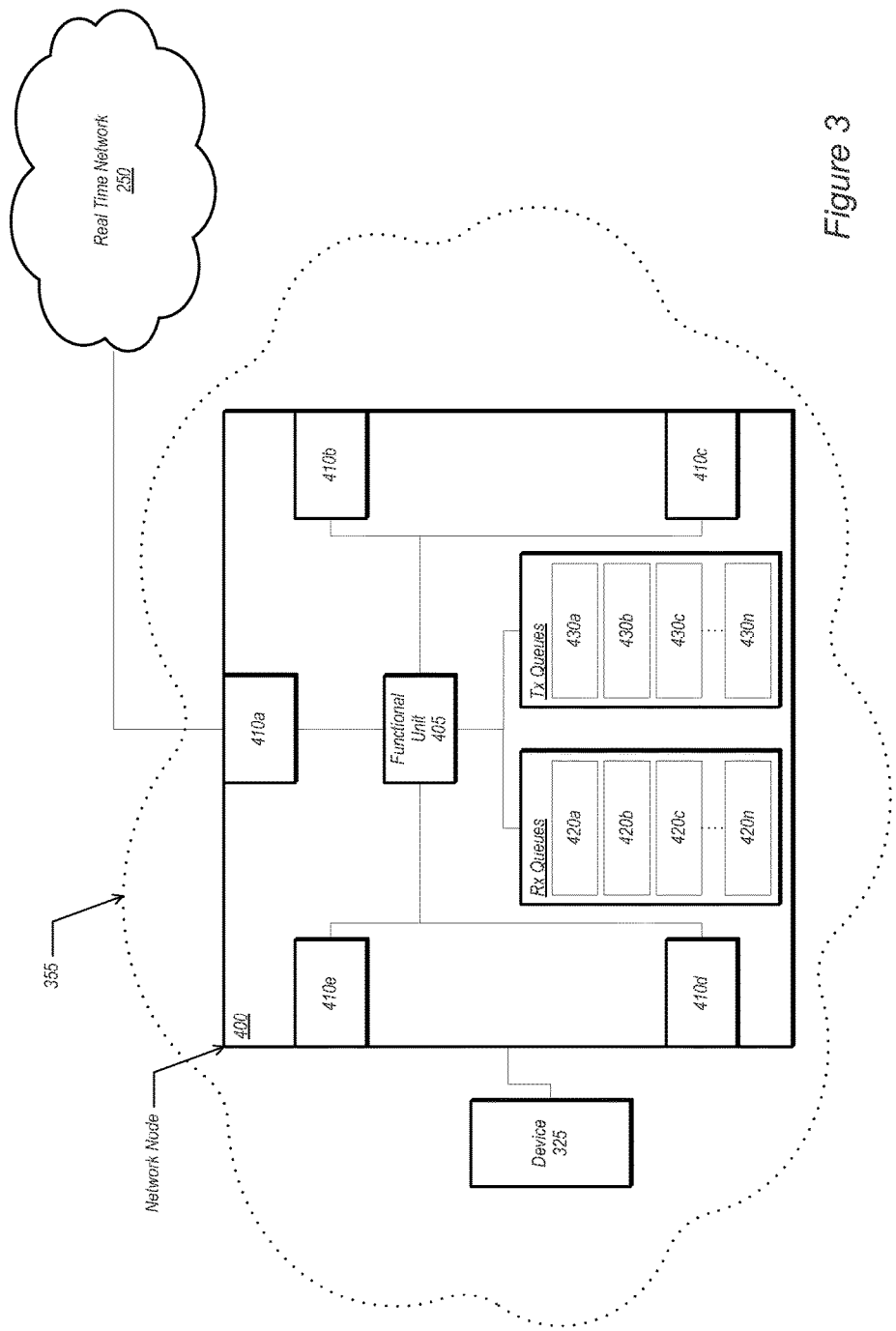
FIG. 3 is an exemplary block diagram of a system for allowing interoperability between real-time networks according to embodiments.

FIGS. 2-3: Exemplary Systems for Interoperability Between Networks

FIG. 2 is a block diagram of an exemplary system for interoperability between networks, such as real time networks 350 and 250. It should be noted that although real time network 350 is illustrated as encompassing network switch 200, NIC 300, and device 325, it is envisioned that network 350 may include one or more network switches, one or more network nodes, such as NICs, and one or more devices. In some embodiments the system for interoperating between a first real time network, such as network 350, and a second real time network, such as network 250, may include a network switch, such as network switch 200, and a NIC, such as NIC 300.

In an exemplary embodiment, network switch 200 may include a plurality of ports 210a-210e and switch circuitry 205 coupled to the plurality of ports. Note that in some embodiments, switch circuitry 205 may include one or more functional units. At least one port, e.g., port 210e, may be coupled to node operating in the first real time network, e.g., node 300 or real time network 350. Real time network 350 may carry first traffic. In one embodiment, the first traffic may include best effort traffic and first real time traffic. Additionally, additional ports, such as, port 210a, may be configured to couple to a node of a second real time network, such as real time network 250. Real time network 250 may carry second traffic and the second traffic may include only second real time traffic.

In one embodiment, switch circuitry 205 may be coupled to the ports 210a-210e and may be configured with a mapping that specifies data routing between the ports. Thus, switch circuitry 205 may be configured to route packets between a first real time network, such as real time network 350, and the one or more second real time networks, such as real time network 250, based on the mapping and may maintain real time behavior between (or of) the first real time traffic and the second real time traffic. In one embodiment, during operation, the switch circuitry 205 may insert routing information in packets routed from real time network 250 to real time network 350 and may remove routing information from the packets routed from real time network 350 to real time network 250. Additionally, in an exemplary embodiment, switch circuitry 205 may be configured to route packets to distinct queues for the first traffic and the second traffic for processing by an application executing on at least one device, such as device 325. Further, the routing of the packets to the distinct queues may be performed based on the mapping. It should be noted that device 325 may be or include any of: instruments, data acquisition devices, smart sensors, or any of various types of devices that are configured to acquire and/or store data. In other words, device 325 may be or include a measurement device or multiple measurement devices.

In one embodiment, the distinct queues may include queue pairs associated with first traffic and additional queue pairs associated with second traffic. In such embodiments, switch circuitry 205 may be further configured to time stamp ingress and egress of packets to/from the first queue pairs and the one or more second queue pairs and the application may correlate clock synchronization information of the real time network 350 and real time network 250 based on the time stamps.

In certain embodiments, additional ports of the network switch, e.g., one or more other ports of the plurality of ports of the network switch, such as ports 210b-210d of network switch 200, may each be configured to couple to a corresponding other second real time network, e.g., a real time network carrying only second traffic. In other words, exemplary ports 210b-210d may be configured to couple to a corresponding second real time network.

Although switch circuitry 205 has been described as being included in network switch 200, it is envisioned that in various embodiments, switch circuitry 205 may be distributed throughout various devices and/or nodes within the real time network. Thus, for example, switch circuitry 205 may include multiple functional units and the functional units may be distributed across the real time network. Thus, at least one of the multiple functional units may be included in the network switch as described above and an additional functional unit may be include in a device, e.g., device 325. In one embodiment a network node may include both a network switch, such as switch 200, and a device, such as device 325. In further embodiments, the network node may be configured as a bridge between the real time networks.

In yet other embodiments, a network node may include a NIC, such as NIC 300. Additionally, the network node may include a device, such as device 325. In an exemplary embodiment, the device may be or include an embedded device. The embedded device may include one or more measurement devices.

Further, in some embodiments, the network node may include both a NIC, such as NIC 300, and a network switch, such as network switch 200. In such embodiments, the network node may also include a device, such as device 325. In an exemplary embodiment, the device may be or include an embedded device. In some embodiments, the embedded device may include one or more measurement devices. Additionally, in some embodiments, the network node may be configured as a bridge between real time networks. The system may further include one or more additional network nodes, which in conjunction with the network node, form a plurality of network nodes. Each network node may include a NIC and a network switch with the functionalities disclosed above, and each network node of the plurality of network nodes may be configured as a bridge between the real time networks.

FIG. 3 is a block diagram of another exemplary system for interoperability between networks, such as real time network 355, configured to carry first traffic (which may include first real time traffic and best effort traffic) and real time network 250, configured to carry second traffic (which may include only second real time traffic). Note that blocks with similar or the same functionality as blocks previously described above in reference to FIG. 2 are labeled similarly. Thus, real time network 250 may have the same or similar functionality as real time network 250 of FIG. 2. Similarly, device 325 of FIG. 2 may have the same or similar functionality as device 325 of FIG. 3.

In an exemplary embodiment, a network node 400 for interoperating between real time network 355 and real time network 250 may include a functional unit 405 and a plurality of ports, e.g., ports 410a-410e, coupled to functional unit 405. A first port, e.g., port 410a, may be configured to couple to a network node of real time network 250. Additionally, network node 400 may include a plurality of second traffic receive packet queues, e.g., queues 420a-420n, coupled to functional unit 405. The second traffic receive packet queues may be configured to store received packets from respective real time networks carrying second traffic, where a first second traffic receive packet queue, e.g., receive packet queue 420a, corresponds to real time network 250. Network node 400 may further include a plurality of second traffic transmit packet queues, e.g., queues 430a-430n, coupled to functional unit 405. The second traffic transmit packet queues may be configured to store packets received from a device coupled to network node 400, such as device 325. Thus, for example, second traffic transmit packet queue 430a may correspond to queue 420a and store packets for transmission to real time network 250.

In some embodiments, functional unit 405 may be configured to communicate tagged packets with the real time network 355 via a second port, e.g., one of ports 410b-410e. In such embodiments, the second port, e.g., port 410b, may be configured to couple to another network node of real time network 355 and functional unit 405 may forward packets received from real time network 250 to real time network 355 via the second port. Additionally, the second port, e.g., port 410b, may be configured to receive packets from real time network 355 and the functional unit may forward the packets received via the second port to the first port.

Further, functional unit 405 may be configured to insert a VLAN tag indicating real time network 250 into each packet received from real time network 250 by the first port, e.g., port 410a, before routing each packet to either the second port, e.g., port 410b, one or more other ports of the plurality of ports, e.g., ports 410c-410e, or to the first second traffic receive packet queue, e.g., queue 420a, thereby generating tagged packets. Also, the functional unit may be configured to remove the VLAN tag from each VLAN tagged packet received by the second port (e.g., port 410b), the one or more other ports (e.g., ports 410c-410e), or from the second traffic transmit packet queue that corresponds to the first second traffic receive packet queue, e.g., queue 430a, before forwarding, via the first port (e.g., port 410a), each received VLAN tagged packet to a node of real time network 250.

In certain embodiments, functional unit 405 may be configured to queue at least a subset of tagged packets received by network node 400 in second traffic receive packet queue 420a for subsequent provision to device 325. Additionally, functional unit 405 may be configured to queue packets received from device 325 in second traffic transmit packet queue 430a before forwarding each packet to port 410a, thereby generating tagged packets.

It should be noted that the number and labels of the various ports, queues, and networks disclosed herein are exemplary only, and are not intended to limit the ports, queues, and networks to any particular number, form, or function.

FIGS. 4-8: Exemplary Implementations of Devices and Systems for Interoperability Between Real Time Networks FIGS. 4 through 8 illustrate implementations of embodiments of the present techniques to allow interoperability between real time networks. The implementations described herein are for explanation purposes only and are not intended to limit the scope of the present invention to any particular form, architecture, or functionality. Each implementation may use all or a portion of the embodiments described above in reference to FIGS. 1-3.

Figure 4:
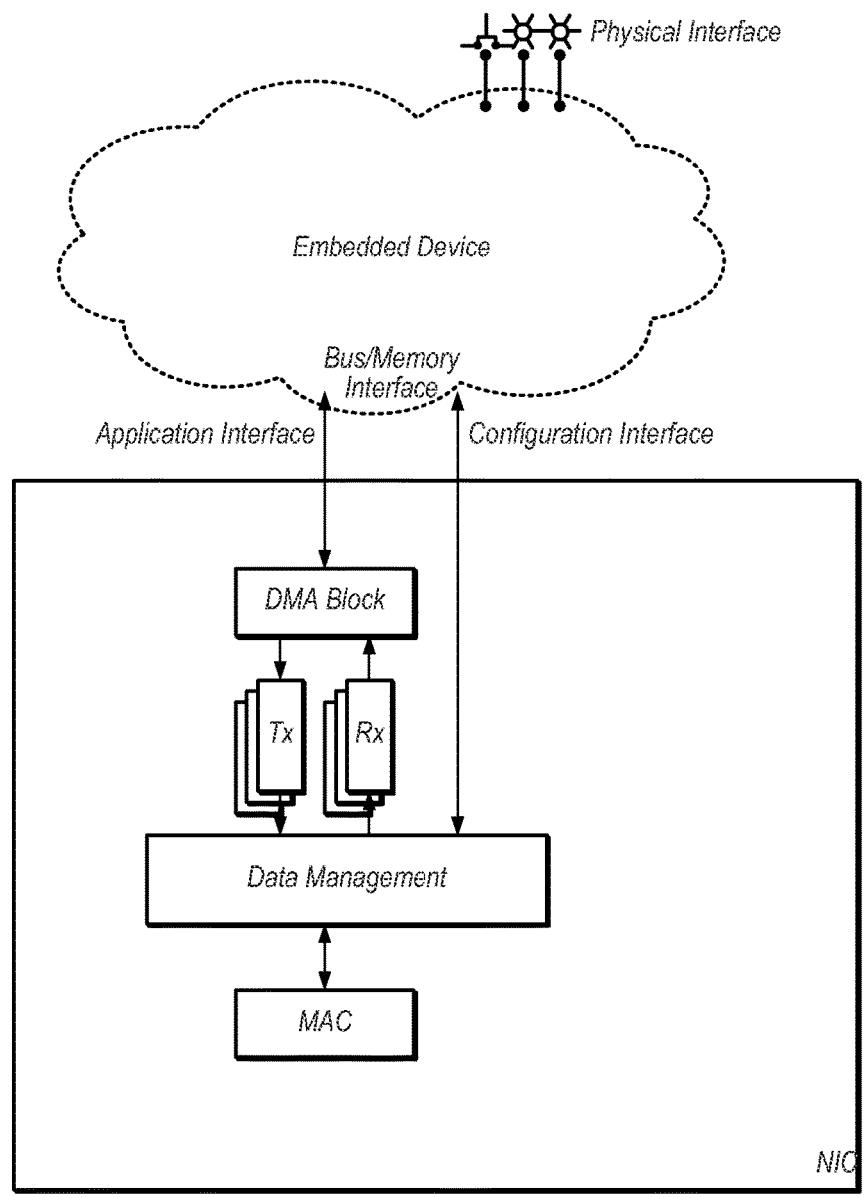
FIG. 4 is an exemplary block diagram of a real-time network interface controller (NIC) according to one embodiment.

FIG. 4 is a high level block diagram of an exemplary implementation of a network interface controller (NIC) with support for a real time network carrying first traffic, defined above. In some embodiments, the NIC may be included in a network node. Additionally, the network node may include or be coupled to a device, such as a measurement device. In some embodiments, the device may include an embedded device which may include a physical interface and a bus/memory interface, including an application and configuration interface.

The NIC may include a functional unit configured to implement the logic described herein. For example, the functional unit may be configured to control the VLAN data management block as well as the dynamic memory access (DMA) block. Additionally, the functional unit may be coupled to and communicate with the physical layer (PHY), the media access layer (MAC), and time stamp unit(s) (TSU) of the NIC. Note that in some embodiments, the PHY may include a TSU.

In some embodiments, the functional unit, via the VLAN data management block, may segregate traffic based on VLAN tags, such as the VLAN tags described above. The VLAN data management block may be coupled to a plurality of transmit (Tx) queues and a plurality of receive (Rx) queues. In some embodiments, a subset of the Tx queues may include a plurality of second traffic (as defined above) transmit packet queues. Similarly, a subset of the Rx queues may include a plurality of second traffic receive packet queues. The DMA block may be configured via software to read and write data to the embedded device via the application interface. Data received by the NIC, such as tagged packets from a real time network carrying second traffic, are routed to the VLAN data management block which segregates the data into the appropriate Rx queue. Then, the DMA block may read the data from the Rx queue and write the data to the embedded device. Additionally, the embedded device may generate data which is read by the DMA block and written to the appropriate Tx queue.

Figure 5:
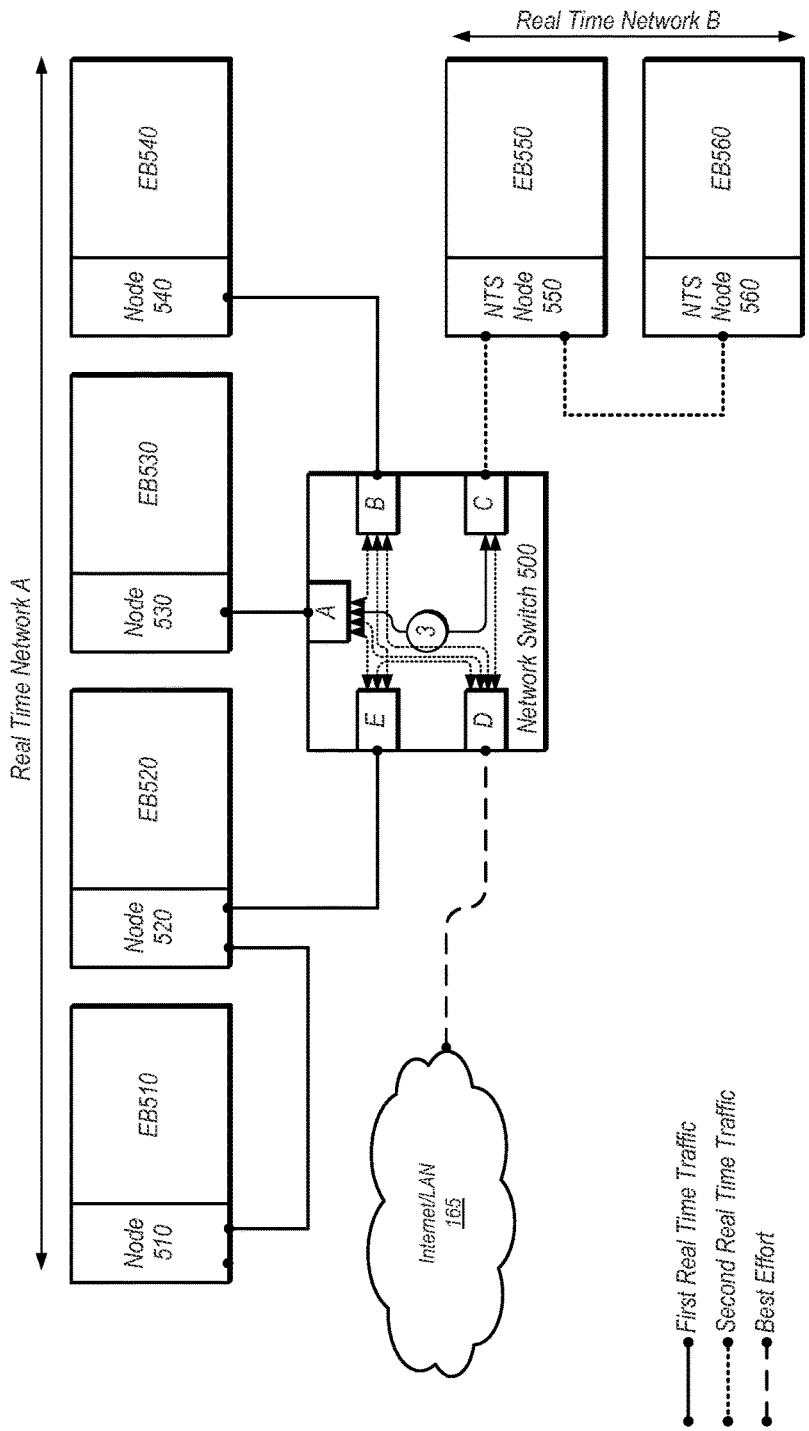
FIG. 5 illustrates an exemplary system for routing packets according to one embodiment.

FIG. 5 is an example topology of a system allowing interoperability between a first real time network, e.g., real time network A, and second real time network, e.g., real time network B, although the topology shown, and the various elements included therein, are meant to be exemplary only. The first real time network may carry first traffic, including first real time traffic and best effort traffic, and the second real time network may carry second traffic, including only second real time traffic. The first real time network may include a network switch which allows the interoperability between the real time networks. The network switch may include any features, in any combination, of the embodiments described above in reference to network switches 100, 200, and 400. The network switch 500 may include multiple ports, e.g., ports A-E. In the embodiment shown, ports A, B, and E are each coupled to a network node. Port A may be coupled to node 530 which may be similar and have the same or similar functionality to NIC 300 or the functionality described above in reference to the NIC of FIG. 4. In this particular example, node 530 may be coupled to embedded device EB530. Note, however, that node 530 may alternatively include embedded device EB530. Similar to port A, port B may be coupled to node 540, where node 540 may have similar or the same functionality as node 530. Node 540 may be coupled to or include embedded device EB540. Additionally, port E may be coupled to node 520. Node 520 may include both a NIC and a network switch. The NIC of node 520 may be coupled to or include embedded device EB520. Further, as disclosed above, node 520 may have multiple functional units or a single functional unit. In other words, node 520 may include a first functional unit to control the network switch and a second functional unit to control the NIC or node 520 may have a single functional unit to control both the NIC and network switch. Also, node 520 may be configured as a bridge and may be coupled to node 510 via a port of the network switch of node 520. TS node 510 may be similar to node 520 and include both a NIC and network switch. Embedded device EB510 may be included in or coupled to node 510.

Ports D and C of the network switch may be coupled to networks or nodes other than networks or network nodes. For example, port D may be coupled to an Ethernet network, such as Internet/LAN 165 whereas port C may be coupled to a node of real time network B, such as node 550. Node 550 may include or be coupled to embedded device EB550. Further, node 550 may be configured as a bridge to node 560 which may be coupled to or include embedded device EB560. In other words, node 510 may include both a NIC and a switch.

In order to allow interoperability between the networks, e.g., between nodes 510-540 of real time network A and nodes 550 and 560 of real time network B, network switch 500 may include or implement embodiments of the invention as described above. For example, switch circuitry included in network switch 500 may be configured to insert a VLAN tag into each packet received via port C. In other words, each packet received from the real time network B may be tagged, for example with "VLAN 3". Further, the switch circuitry may be configured to remove VLAN tags from each packet received via port A before forwarding each packet to real time network B via port C. Thus, packets received via port A and containing the tag "VLAN 3" would have the tag removed prior to the packet being forwarded to real time network B port C. Note that in the configuration as described, only port A may egress packets tagged with "VLAN 3", e.g., packets received from real time network B via port C. All other ports are configured to discard packets with the "VLAN 3" tag.

As previously mentioned, each network node of real time network A may be configured with any of the features of the embodiments described above. For example, node 530, coupled to port A, may include a functional unit configured to segregate and queue network packets based on VLAN tags. Thus, the NIC of node 530 may include a plurality of second traffic receive packet queues and each second traffic receive packet queue may be configured to store received packets from respective networks carrying second traffic, including a first second traffic receive packet queue configured to store packets received from real time network B. Additionally, the NIC may include a corresponding plurality of second traffic transmit packet queues, and each second traffic transmit packet queue may be configured to store packets received from EB530 for the respective networks carrying second traffic. Thus, a first second traffic transmit packet queue may correspond to the first second traffic receive packet queue and store packets for transmission to real time network B. Also, the functional unit of the node 530 may be coupled to the plurality of second traffic receive packet queues and the plurality of second traffic transmit packet queues and configured to queue tagged packets received from port A in the first second traffic receive packet queue for subsequent provision to EB530. Additionally, the functional unit may be configured to queue packets received from EB530 in the first second traffic transmit packet queue and insert the VLAN tag indicating real time network B, e.g., "VLAN 3," into each packet received from the first second traffic transmit packet queue before forwarding the packet to port A of network switch 500.

Figure 6:
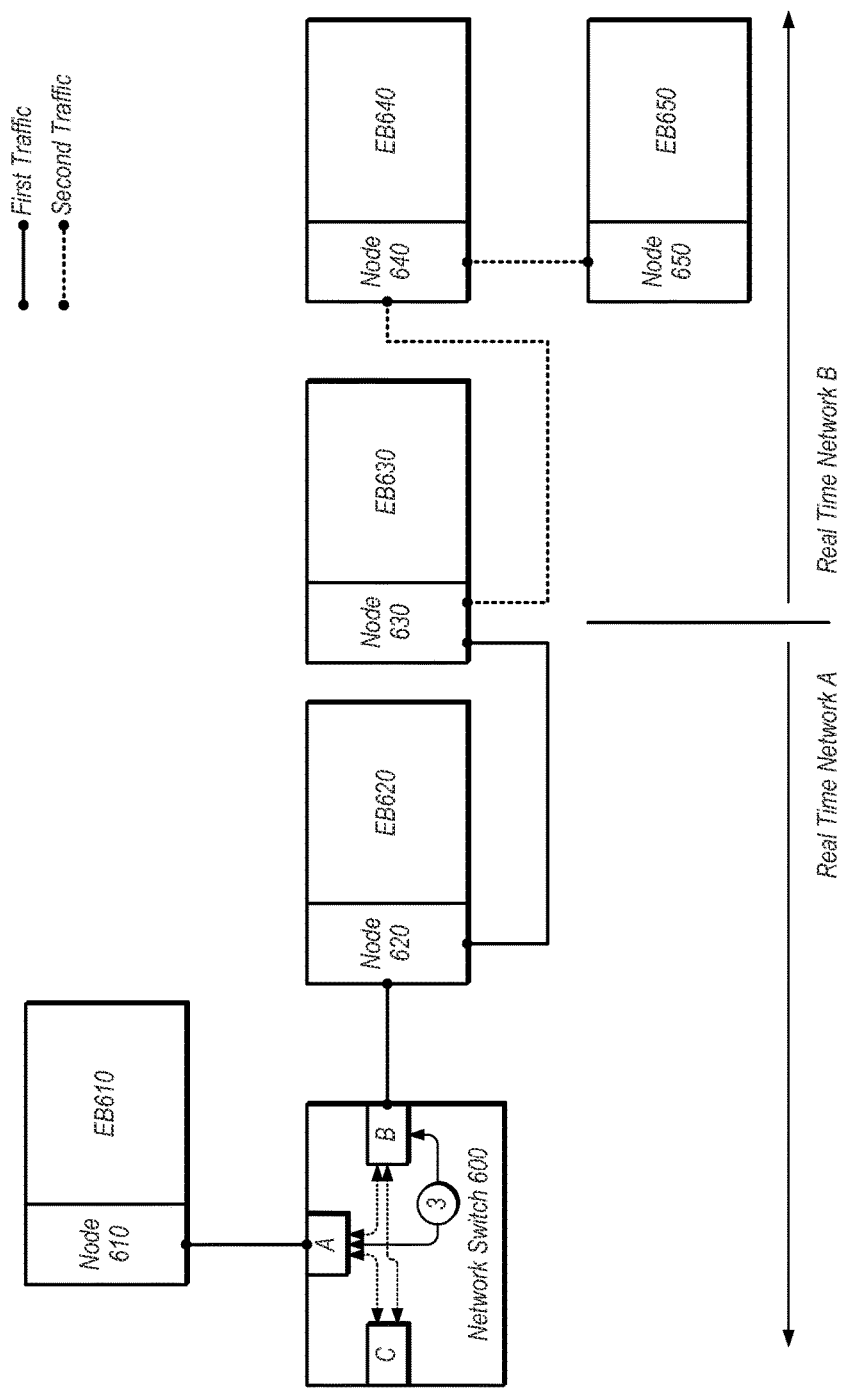
FIG. 6 illustrates an exemplary system for routing packets according to another embodiment.

FIG. 6 is an example of an alternate topology of a system allowing interoperability between real time networks, such as real time network A, carrying first traffic, and real time network B, carrying second traffic. In such a topology, the real time network A may include one or more network nodes and switches, such as nodes 610-630 and network switch 600. Note that embedded devices EB610-630 may be included in or coupled to respective nodes 610-630. Additionally, as shown, node 630 may be configured as a bridge between the real time networks. Real time network B may include nodes 640-650 where embedded devices EB640 and EB650 are included in or coupled to respective nodes 640 and 650. In order for node 630 to function as a bridge between the networks, it may include both a network switch and NIC configured with embodiments of the present invention to allow VLAN tagging of packets received from real time network B, e.g., node 640. Additionally, node 620 may also include a network switch and NIC configured with embodiments of the present invention to allow forwarding of VLAN tagged packets to other destinations within real time network A, such as node 610 via network switch 600, which each may include embodiments of the present invention to allow forwarding and segregation of VLAN tagged packets.

Figure 7:
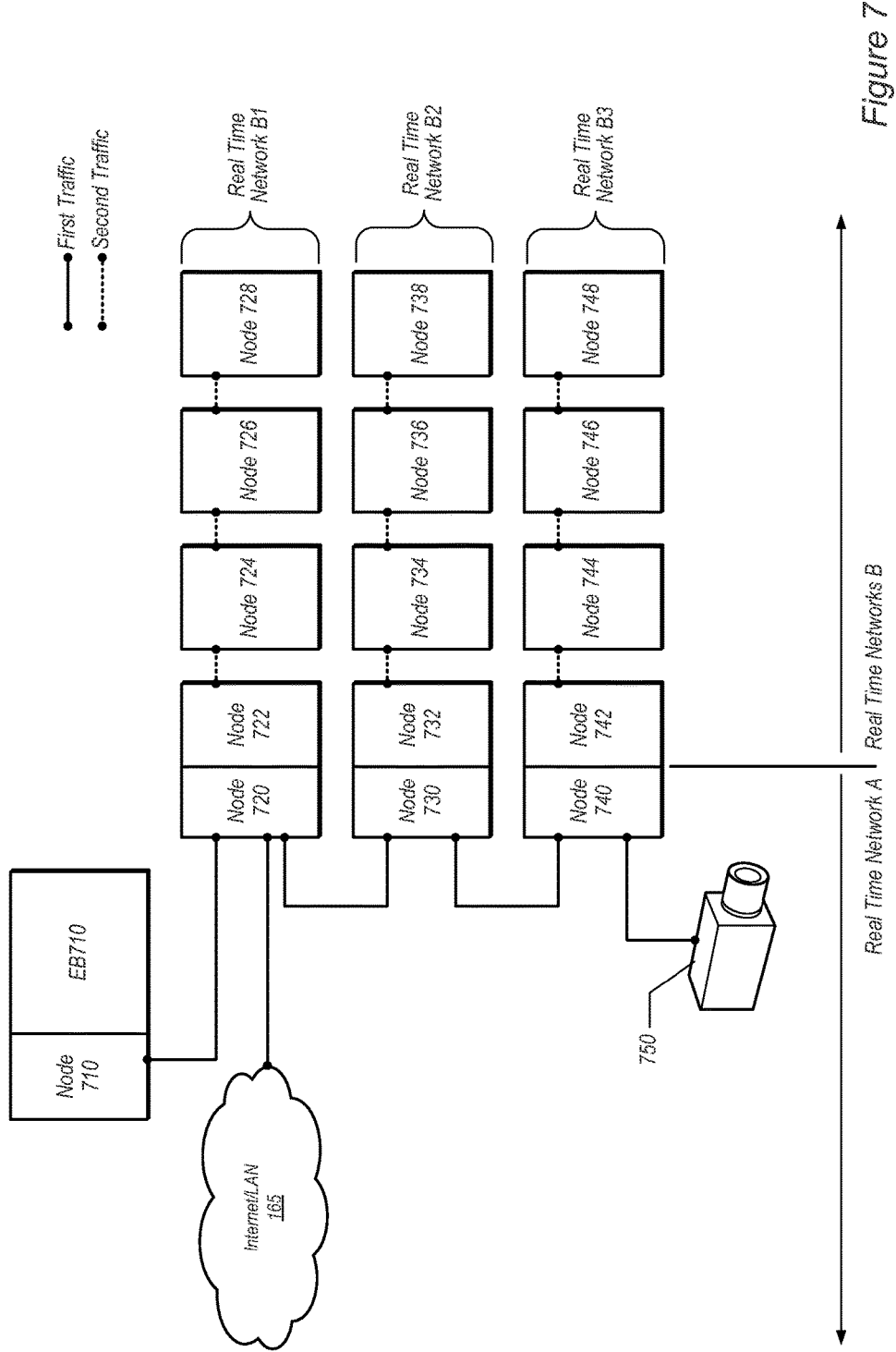
FIG. 7 illustrates an exemplary system for routing packets according to an embodiment.

FIG. 7 is an example topology of another alternate system allowing interoperability between real time network A, carrying first traffic (which, as defined above, may include first real time traffic and best effort traffic), and real time networks B, carrying second traffic (which, as defined above, may only include second real time traffic). In such a topology, the real time network A may include multiple network nodes, each coupled to a respective real time network B. Thus, for example, node 720 may be coupled to real time network B1 which includes nodes 722-728, node 730 may be coupled to real time network B2 which includes nodes 732-738, and node 740 may be coupled to real time network B3 which includes nodes 742-748. Additionally, each of real time networks B may be assigned a specific VLAN tag indicating the network. For example, packets received from node 722 may be tagged with a "VLAN 2" tag whereas packets received from node 732 may be tagged with a "VLAN 3" tag and packets received from node 742 may be tagged with a "VLAN 4" tag. Further, each of the nodes 720-740 may include both a NIC and a network switch, each configured according to an embodiment of the present invention allowing for the management of tagged packets. Also, node 710, which may be coupled to or include embedded device 710, may be configured according to an embodiment of the present invention to manage packets received from each of the respective real time networks B. Thus, node 710 may be configured with a respective second traffic receive packet queue and a respective second traffic transmit packet queue for each respective real time networks B. In other words, node 710 may include a send/receive queue pair associated with each VLAN tag, e.g., a send/receive queue pair for "VLAN 2" tagged packets, a send/receive queue pair for "VLAN 3" tagged packets, and a send/receive queue pair for "VLAN 4" tagged packets. Additionally, node 710 may include a send/receive queue pair for first traffic packets, such as those generated by real-time camera 750 and received via node 720 from Internet/LAN 165.

Figure 8:
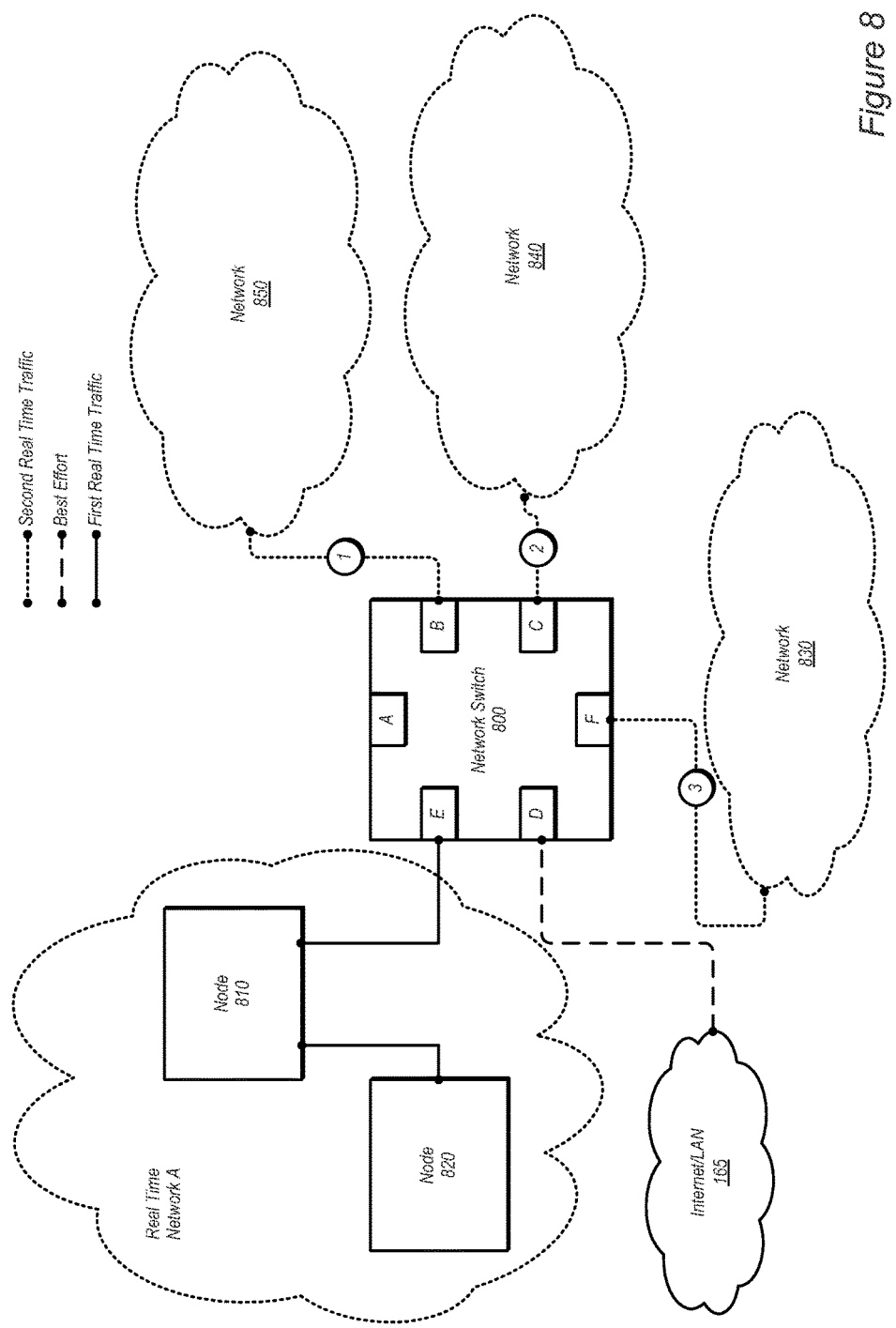
FIG. 8 illustrates an exemplary system for routing according to an embodiment.

FIG. 8 is an example topology of yet another alternate system allowing interoperability between real time network A, carrying first traffic and networks 830-850, carrying second traffic. In such a system, the interoperability between the networks may be managed by network switch 800 configured in accordance with embodiments of the present invention. Thus, network switch 800 may be configured to tag packets received from network 830 with a "VLAN 3" tag, packets received from network 840 with a "VLAN 2" tag, and packets received from network 850 with a "VLAN 1" tag. Also, similar to node 710, nodes 810 and 820 may be configured to segregate packets received from and destined for each of networks 830-850 in respective send/receive queue pairs while also segregating network packets from real time network A and Ethernet packets received via network switch 800 from Internet/LAN 165.

Figure 9A:
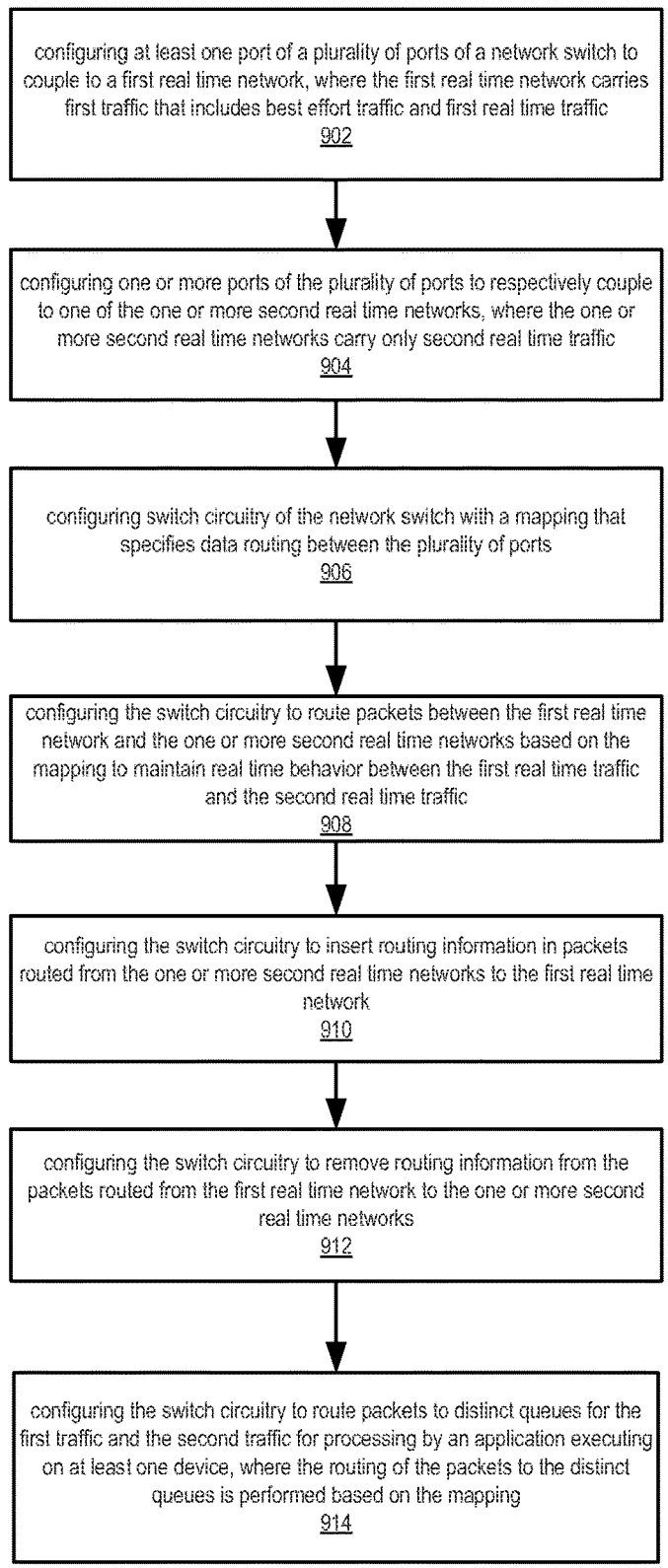
FIGS. 9A and 9B are flowchart diagrams illustrating methods for configuring the routing packets between real time networks according to embodiments.
Figure 9B:
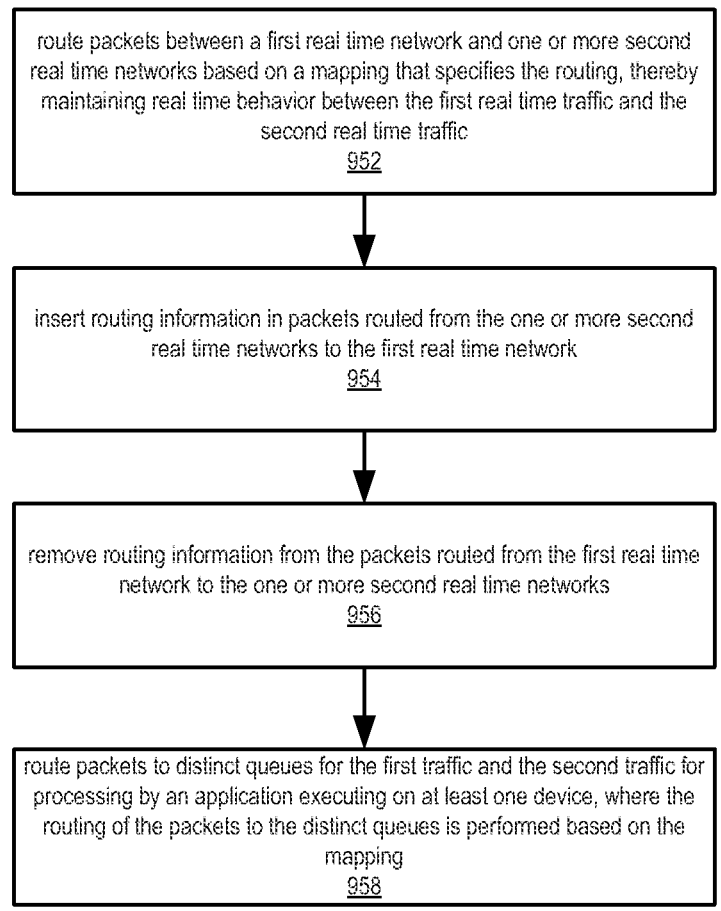

FIGS. 9A-9B—Flowcharts of Methods for Interoperating Between Real Time Networks FIGS. 9A-B illustrate methods for configuring interoperability between a first real time network and one or more second real time networks, according to one embodiment. The first real time network may carry first traffic comprising best effort traffic and first real time traffic and the one or more second real time networks may carry only second real time traffic. The methods shown in FIGS. 9A-B may be used in conjunction with any of the systems or devices shown in any of the Figures described herein, among other devices. In various embodiments, some of the method elements shown may be performed concurrently, in a different order than shown, or may be omitted. Additional method elements may also be performed as desired. As shown, the method illustrated in FIG. 9A may operate as follows.

First, in 902 at least one port of a plurality of ports of a network switch may be configured to couple to the first real time network which may carry first traffic.

In 904, one or more ports of the plurality of ports may be configured to respectively couple to one of the one or more second real time networks which may carry second traffic.

In 906, switch circuitry of the network switch may be configured with a mapping that specifies data routing between the plurality of ports. In one embodiment, the switch circuitry may include one or more functional units. In such embodiments, configuration of the switch circuitry may include configuration of the one or more functional elements. Additionally, in certain embodiments, the network switch may be included in a network node. In such embodiments, the network node may be configured as a bridge between the first real time network and at least one of the one or more second real time networks.

In 908, the switch circuitry may be configured to route packets between the first real time network and the one or more second real time networks based on the mapping to maintain real time behavior between the first real time traffic and the second real time traffic.

In 910, the switch circuitry may be configured to insert routing information in packets which may be routed from the one or more second real time networks to the first real time network.

In 912, the switch circuitry may be configured to remove routing information from the packets routed from the first real time network to the one or more second real time networks.

In 914, the switch circuitry may be configured to route packets to distinct queues for the first traffic and the second traffic for processing by an application executing on at least one device. Additionally, the routing of the packets to the distinct queues may be performed based on the mapping. Further, in one embodiment, the distinct queues may include first queue pairs associated with first traffic and one or more second queue pairs associated with second traffic. In such embodiments, the switch circuitry may be further configured to time stamp ingress and egress of packets to/from the first queue pairs and the one or more second queue pairs. Further, the application may correlate clock synchronization information of the first real time network and one or more second real time networks based on the time stamps.

Turning to FIG. 9B, in 952, packets may be routed between a first real time network and one or more second real time networks based on a mapping that may specify the routing. The mapping may maintain the real time behavior between the first real time traffic and the second real time traffic.

In 954, routing information may be inserted in packets routed from the one or more second real time networks to the first real time network.

In 956, routing information may be removed from the packets routed from the first real time network to the one or more second real time networks.

In 958, packets may be routed to distinct queues for the first traffic and the second traffic for processing by an application executing on at least one device and the routing of the packets to the distinct queues may be performed based on the mapping. In one embodiment, the distinct queues may include first queue pairs associated with first traffic and one or more second queue pairs associated with second traffic. In such embodiments, the method may further include time stamping ingress and egress of packets to/from the first queue pairs and the one or more second queue pairs. Accordingly, the application may correlate clock synchronization information of the first real time network and one or more second real time networks based on the time stamps.

Figure 10:
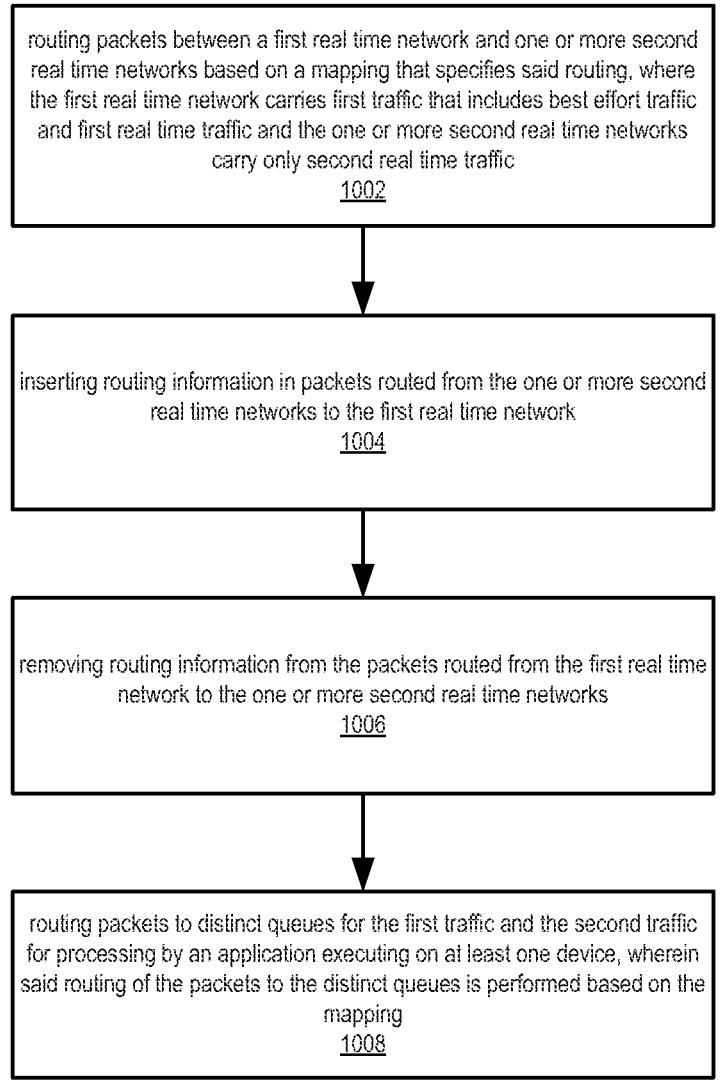
FIG. 10 is a flowchart diagram illustrating a method of routing packets between real time networks according to one embodiment.

FIG. 10—Flowchart of a Method for Interoperating Between Real Time Networks

FIG. 10 illustrates a method for interoperating between a first real time network and one or more second real time networks, according to one embodiment. As described above, the first real time network may carry first traffic comprising best effort traffic and first real time traffic and the one or more second real time networks may carry only second real time traffic. The method shown in FIG. 10 may be used in conjunction with any of the methods, systems or devices shown in any of the Figures described herein, among other devices. In various embodiments, some of the method elements shown may be performed concurrently, in a different order than shown, or may be omitted. Additional method elements may also be performed as desired. As shown, the method illustrated in FIG. 10 may operate as follows.

First, in 1002 packets may be routed between a first real time network and one or more second real time networks. The routing may be specified by a mapping. As noted above, the mapping may maintain the real time behavior between the first real time traffic and the second real time traffic.

At 1004, routing information may be inserted in packets routed from the one or more second real time networks to the first real time network.

At 1006, routing information may be removed from the packets routed from the first real time network to the one or more second real time networks.

At 1008, packets may be routed to distinct queues for the first traffic and the second traffic for processing by an application executing on at least one device. In one embodiment, routing of the packets to the distinct queues may be performed based on the mapping.

Note that the above described method, in an exemplary embodiment, may be used in conjunction with the methods described above in reference to FIGS. 9A and 9B. In particular, the methods of FIGS. 9A and 9B may configure a system to perform the method described above in reference to FIG. 10. Of course, as will be apparent to those skilled in the art, the method described above may be used independently or in conjunction with other methods.

Figure 11:
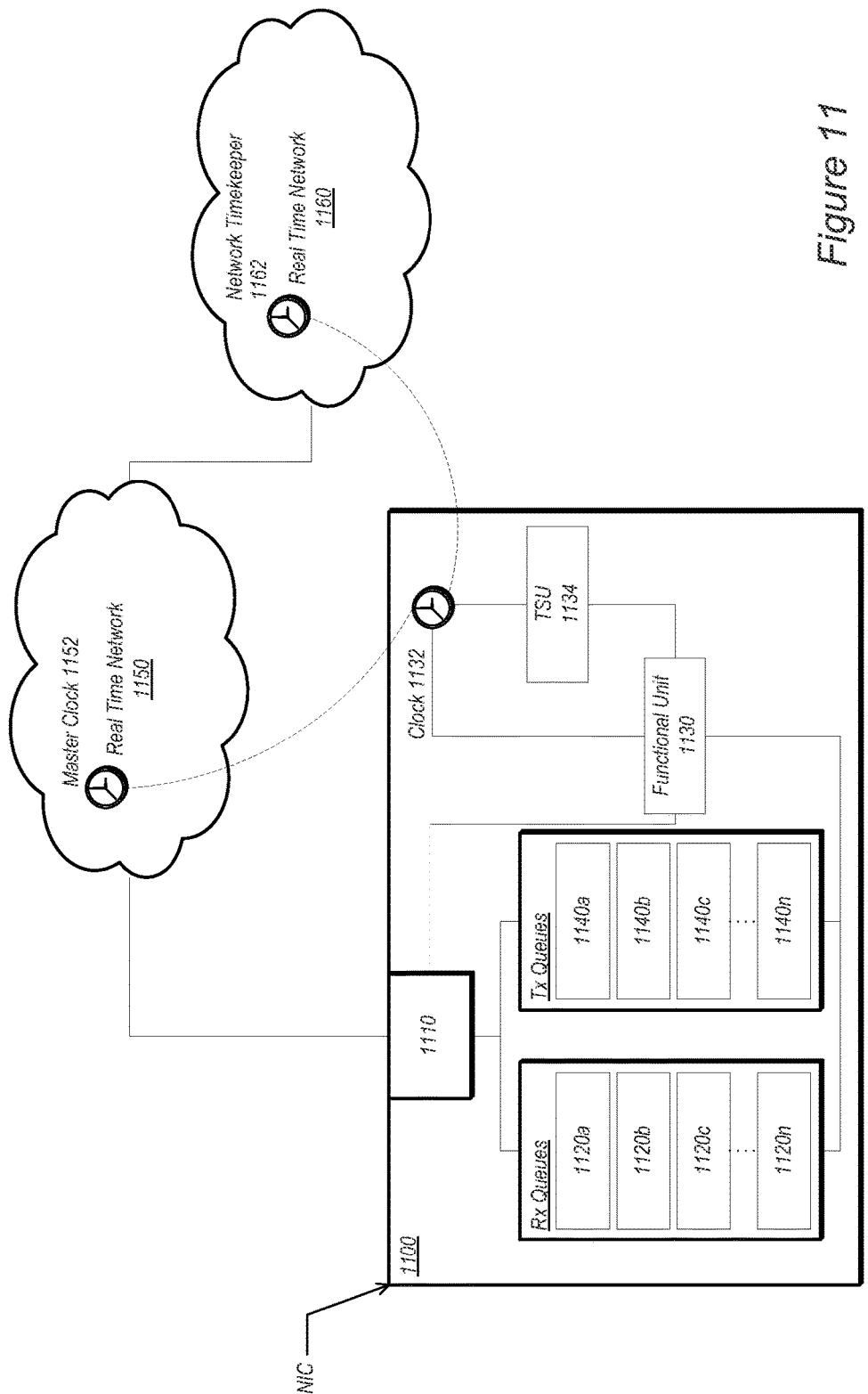
FIG. 11 is an exemplary block diagram of a real-time NIC according to one embodiment.
Figure 12:
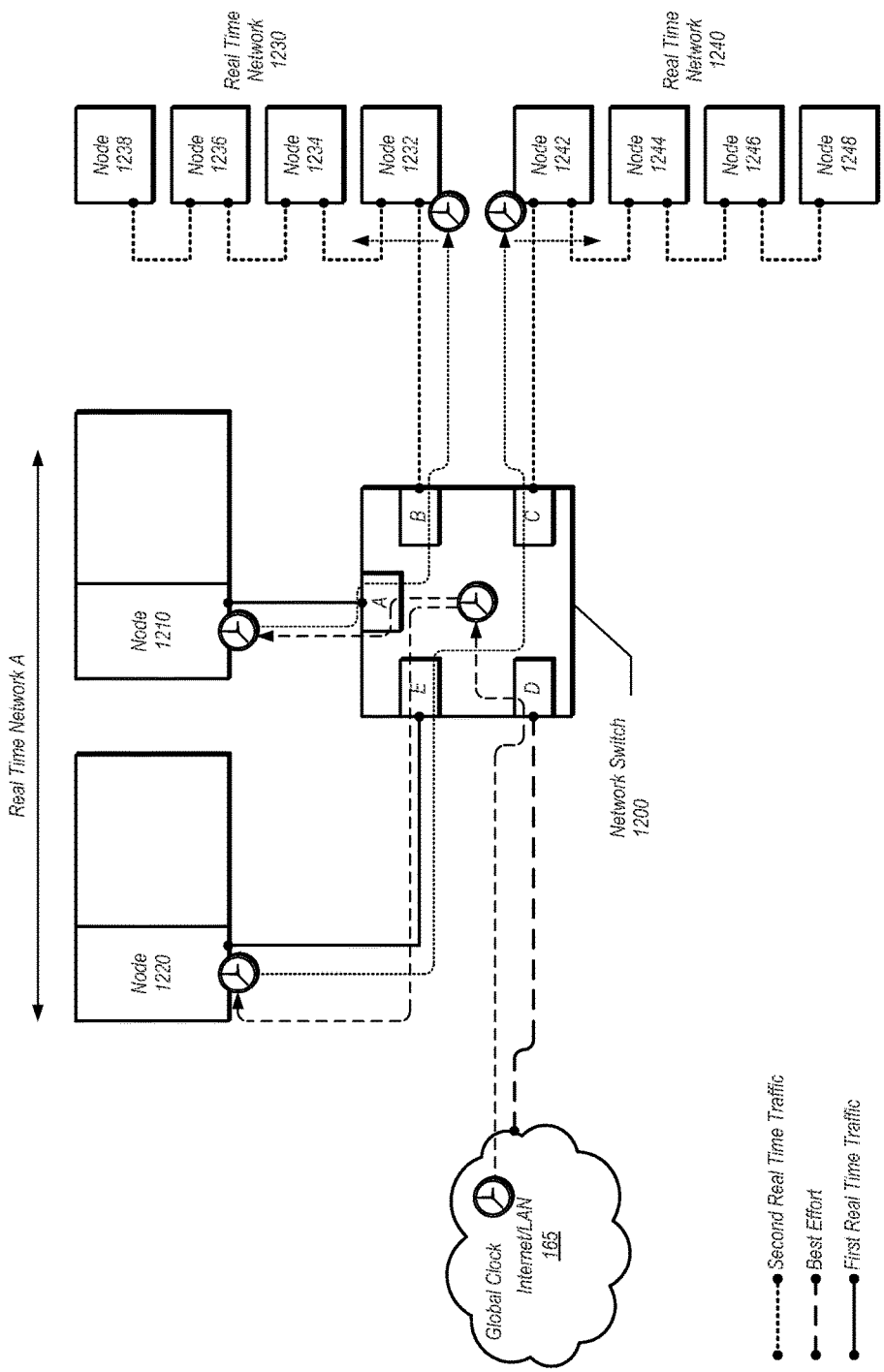
FIG. 12 illustrates an exemplary system for synchronizing clocks between real-time networks according to one embodiment.
Figure 13:
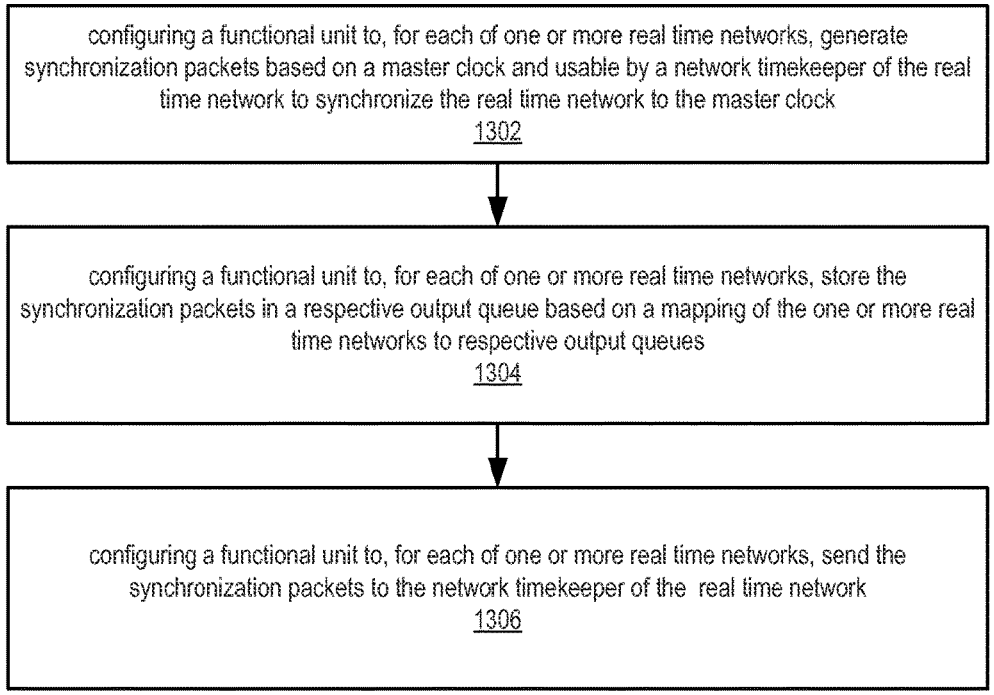
FIG. 13 is a flowchart diagram illustrating a method for configuring the synchronizing clocks between real-time networks according to one embodiment.

FIGS. 11-13: Systems and Methods for Synchronizing a Master Clock Between Networks The systems and methods described below may allow for the synchronization between real time networks using differing real time protocols. For example, in one embodiment a real-time data transfer networks not conforming to the IEEE 802.1 standard for real time data transfer may be synchronized with real time networks conforming to the IEEE 802.1 standard for real-time data transfer. Note that many non-IEEE 802.1 real time networks implement proprietary clock synchronization schemes. Thus, in order to be fully interoperative with an IEEE 802.1 compliant real time network, the network clock synchronization of the IEEE 802.1 compliant real time network may be required to be mapped to each non-IEEE 802.1 compliant real time network that it may be coupled to. In more general terms, the systems and methods below allow for clock synchronization between real time networks operating according to differing protocols.

FIG. 11: Exemplary Block Diagram of a NIC

FIG. 11 is a block diagram of an exemplary NIC (network interface controller) for synchronizing clocks between real time networks. NIC 1100 may be similar to the NICs described above. In some embodiments the NIC 1100 may include a functional unit, such as functional unit 1130, coupled to a port, such as port 1110. Additionally, the NIC may include a clock, such as clock 1132 coupled to the functional unit and synchronized to a master clock, such as Master Clock 1152 of real time network 1150. In some embodiments, the master clock may be included in a network switch of the real time network. In other embodiments, the master clock may be external to the real time network, such as an external network timekeeper. In certain embodiments, the master clock may be synchronized to a global clock external to the real time network.

The clock may also be coupled to a time stamp unit (TSU), such as TSU 1134. The TSU may also be coupled to the functional unit. In some embodiments, the TSU may be included in the physical layer of the NIC. Further, the NIC may include a plurality of input/output queue pairs, such as Rx (receive) queues 1120a-1120n and Tx (transmit) queues 1140a-1140n coupled to the functional unit and the port, for segregation of network packets based on a mapping of one more real time networks to respective output (e.g., Tx) queues. For example, input queue 1120a may have a corresponding output queue 1140a, and both may correspond to real time network 1160. Additionally, the input queues may be receive packet queues as discussed above and the output queues may be transmit packet queues as discussed above.

For each of the respective real time networks, the functional unit may be configured to generate synchronization packets usable by a network timekeeper, e.g., a clock that is synchronized to a master clock, of the respective real time network to synchronize the respective real time network to the master clock. In one embodiment, this may include using the TSU to generate time stamps for the synchronization packets in accordance with the clock synchronized to the master clock and communicate with the respective real time network via the port using the corresponding input/output queue pair. In other words, the functional unit may store the synchronization packets in respective output (e.g., Tx)

queues based on the mapping and send the synchronization packets to the network timekeeper of the respective real time network via the port.

In an exemplary embodiment, the functional may be further configured to egress the synchronization packets via the output queue of the at least one input/output queue pair based on a specified egress period. The specified egress period may specify a time window and frequency for egressing the synchronization packets.

Thus, for example, functional unit 1130 may generate synchronization packets usable by timekeeper 1162 of real time network 1160 to synchronize real time network 1160 to master clock 1152 of real time network 1150. Additionally, to generate the synchronization packets, functional unit 1130 may use TSU 1134 to generate time stamps for the synchronization packets in accordance clock 1132, synchronized to master clock 1152 of real time network 1150. Then, functional unit 1130 may communicate with real time network 1160 via port 1110 using Rx queue 1120a and Tx queue 1140a, including sending the synchronization packets to timekeeper 1162 of real time network 1160.

It should be noted, that real time network 1150 may be required to include embodiments of the functionality discussed above to allow for the interoperability between real time networks 1150 and 1160. Thus, the synchronization packets sent by NIC 1100 may be tagged packets as described in detail above.

In some embodiments, the NIC may be included in a network node. In one embodiment, the network node may include the NIC and a network switch.

FIG. 12: Exemplary System for Synchronizing Clocks Between a Real Time Networks FIG. 12 is an illustration of an exemplary system for synchronizing clocks between a real time networks. As shown, the system may include network switch 1200 and nodes 1210 and 1220. Network switch 1200 may be similar in functionality to the network switches previously described. Thus, network switch 1200 may include a functional unit configured to manage data flow between real time networks. In this particular example, network switch 1200 includes ports A-E. Port B may be configured to couple to real time network 1230 which includes nodes 1232-1238. Note that real time network A may carry first traffic, including first real time traffic and best effort traffic whereas real time networks 1230 and 1240 may carry second traffic, including only second real time traffic. Note that real time networks A, 1230, and 1240 may each operate according to different real time protocols. Accordingly, in one embodiment, real time network A may operate according to IEEE 802.1 while real time networks 1230 and 1240 may operate according to non-IEEE 802.1 protocols.

Thus, in one embodiment, the functional unit may be configured to insert a VLAN tag indicating real time network 1230 in packets received from node 1232 via port B. Similarly, port C may be configured to couple to real time network 1240 which includes nodes 1242-1248. Thus, the functional unit may also be configured to insert a VLAN tag indicating real time network 1240 in packets received from node 1242 via port C.

Nodes 1210 and 1220 may each include a NIC configured similarly to NIC 1100 of FIG. 11. Therefore, nodes 1210 and 1220 may each include a clock synchronized to a master clock. In this particular example, the clock included in network switch 1200 may be configured as the master clock. Thus, the clocks of nodes 1210 and 1220 may each be synchronized to the clock of network switch 1200. Note that since nodes 1210 and 1220 each includes a clock synchronized to a master clock, both are considered timekeepers of the real time network A. Additionally, the master clock of network switch 1200 may be synchronized to a global clock, such as the global clock of Internet/LAN 165.

Further, node 1220 may be configured to propagate its clock via synchronization packets to node 1232, the timekeeper of real time network 1230. Additionally, node 1210 may be configured to propagate its clock via synchronization packets to node 1242, the timekeeper of real time network 1240. Note that each real time network incorporates its own mechanism of synchronizing clocks within each network, thus, by synchronizing the timekeeper for the network, the entire network may be synchronized with the network node sending the synchronization packets. Thus, each node of real time network 1230 may be synchronized with node 1220 and each node of real time network 1240 may; be synchronized with node 1210. Therefore, all networks may be synchronized end-to-end.

Figure 14:
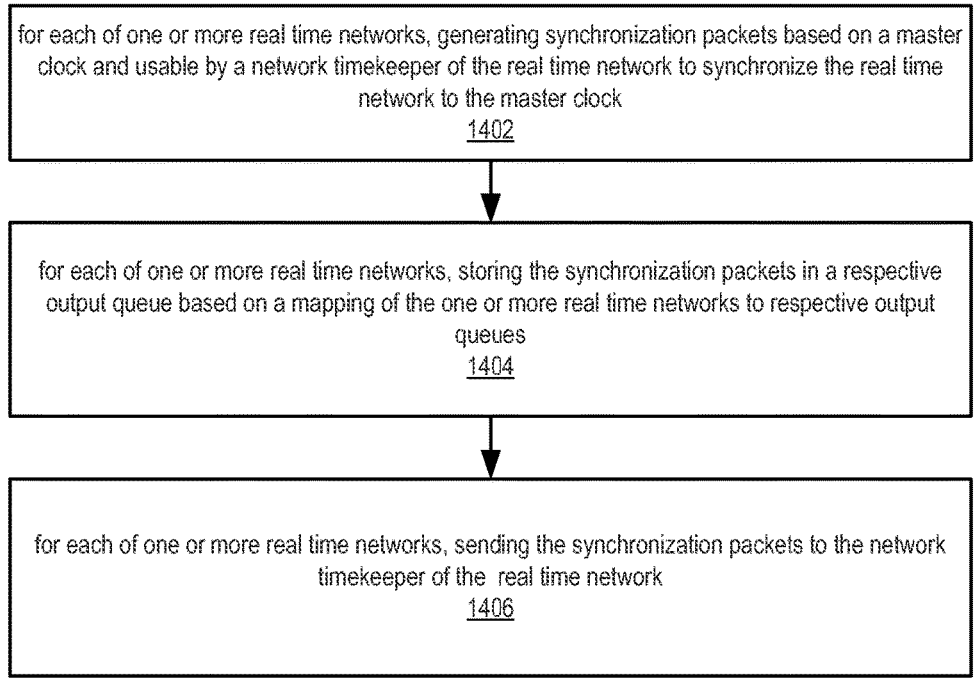
FIG. 14 is a flowchart diagram illustrating a method for synchronizing clocks between real-time networks according to one embodiment.

FIGS. 13-14: Flowcharts for Methods for Synchronizing Clocks Between Real Time Networks FIGS. 13 and 14 illustrate embodiments of methods for synchronization of network timekeepers (e.g., clocks) of one or more real time networks. The methods shown in FIGS. 13 and 14 may be used in conjunction with any of the methods, systems or devices shown in any of the Figures described herein, among other devices. In various embodiments, some of the method elements shown may be performed concurrently, in a different order than shown, or may be omitted. Additional method elements may also be performed as desired. As shown, the method illustrated in FIG. 13 may operate as follows.

In 1302 a functional unit may be configured to, for each of one or more real time networks, generate synchronization packets based on a master clock and usable by a network timekeeper of the real time network to synchronize the real time network to the master clock. The functional unit may be comprised in a NIC, such as NIC 1100 described above.

In 1304, the functional unit to may be configured to store the synchronization packets in a respective output queue based on a mapping of the one or more real time networks to respective output queues. Note that the functional unit may be configured to store the synchronization packets for each of one or more real time networks.

In 1306, the functional unit may be configured to send the synchronization packets to the network timekeeper of the real time network for each of the one or more real time networks In certain embodiments, the method may further include the functional unit being configured to generate synchronization packets usable by a network timekeeper of the respective real time network to synchronize the real time network to the master clock, including using the TSU to generate time stamps for the synchronization packets in accordance with the clock synchronized to the master clock. Additionally, the functional unit may communicate with the respective real time network via a port using the corresponding input/output queue pair, including sending the synchronization packets to the real time network timekeeper of the respective real time network.

In an exemplary embodiment, the functional unit may be further configured to egress the synchronization packets via the output queue of the at least one input/output queue pair based on a specified egress period, wherein the specified egress period specifies a time window and frequency for egressing the synchronization packets. Further, the method may include the function unit egressing the synchronization packets via the output queue of the at least one input/output queue pair based on a specified egress period, wherein the specified egress period specifies a time window and frequency for egressing the synchronization packets.

Turning now to FIG. 14, a method for synchronizing one or more real time networks may operate as follows.

At 1402, synchronization packets based on a master clock and usable by a network timekeeper of the real time network to synchronize the real time network to the master clock may be generated for each of one or more real time networks. Note that the real time networks may each operate according to different protocols. For example, one of the real time networks may carry first traffic that may include both best effort traffic and first real time traffic whereas another one of the real time networks may carry second traffic that may include only second real time traffic. Additionally, real time networks carrying second traffic may each include proprietary synchronization and communication protocols such that the real time networks may not be interoperable.

At 1404, the synchronization packets for each of the one or more real time networks may be stored in a respective output queue based on a mapping of the one or more real time networks to respective output queues.

At 1406, the synchronization packets for each of the one or more real time networks may be sent to the network timekeeper of the real time network.

FIGS. 15-18: Systems and Methods for Scheduled Data Egress from a Network Switch Embodiments of the systems and methods described below may allow for the scheduled egress of data from a network switch, and may allow the scheduling overhead of a network node to be offloaded to a network switch. Thus, the network node may send a plurality of packets to the network switch that need to be scheduled and the network switch may schedule and send the packets at the scheduled time.

Figure 15:
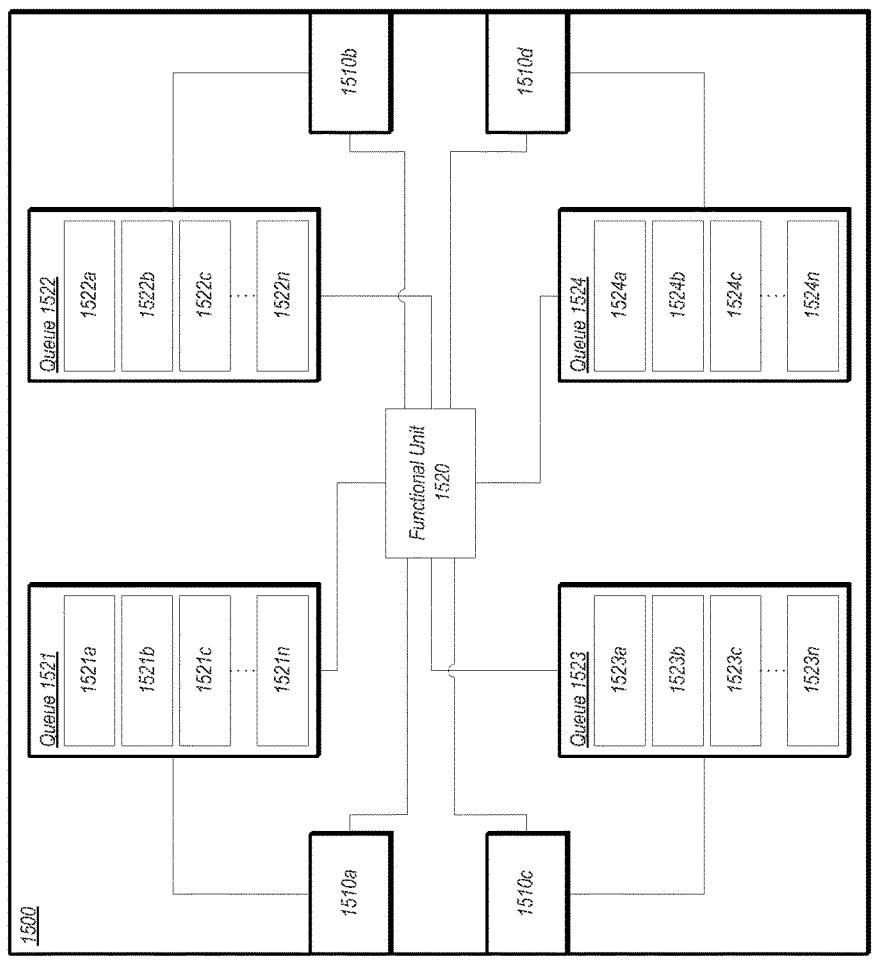
FIG. 15 is an exemplary block diagram of a real-time network switch according to one embodiment.

FIG. 15: Exemplary Block Diagram of a Network Switch Configured for Scheduled Data Egress FIG. 15 is an exemplary block diagram of a network switch configured for scheduled data egress according to one embodiment. As shown in FIG. 15, a network switch, such as network switch 1500, may include switch circuitry, such as switch circuitry 1520. Additionally, the network switch may include a plurality of ports, such as ports 1510a-1510d, and each port may be coupled to the switch circuitry and associated with a respective set of network addresses for packets. Each port may be further configured with a respective set of egress periods, where each packet has a destination address and a type that specifies a respective egress period, where each egress period may specify a respective time window and frequency for egressing packets to network nodes based on the type of the packets. Further, the network switch may include a plurality of queues, coupled to the plurality of ports and the switch circuitry, such as queues 1521a-1521n coupled to port 1510a, queues 1522a-1522n coupled to port 1510b, queues 1523a-1523n coupled to port 1510c, and queues 1524a-1524n coupled to port 1510d. Also, each queue may be associated with a respective packet type and a respective port of the plurality of ports. Note that in one embodiment, the switch circuitry may include one or more functional units.

In certain embodiments, the switch circuitry may be configured to receive one or more packets asynchronously from a network node via a first port. Thus, for example, switch circuitry 1520 may receive one or more packets asynchronously from a network node via port 1510a. In some embodiments, the first port may be configured to couple to anode of another real time network. Note that the other real time network may not be interoperable with the real time network in which switch 1500 is located. In such embodiments, the methods and systems described above may be used to enable interoperability. Additionally, the switch circuitry may be configured to determine a second port, such as port 1510b for egressing at least one of the one or more packets based on the destination address of the at least one packet. In some embodiments, the second port may be configured to couple to a node of another real time network. Further, the switch circuitry may be configured to determine an egress period for egressing the at least one packet based on the type of the at least one packet. Also, the switch circuitry may be configured to determine that the at least one packet cannot currently be egressed from the second port. In some embodiments, to determine that a respective time window for egress of the at least one packet is closed, the switch circuitry may be further configured to determine that there is already a queued packet of the same type queued in the first queue for egress from the second port or determine that the second port is currently egressing a packet.

In response to determining that the at least one packet cannot currently be egressed, the switch circuitry may queue the at least one packet in a first queue of the plurality of queues based on the respective packet type and destination address, where the first queue is associated with the second port. For example, switch circuitry 1520 may determine that port 1510b cannot currently egress the at least one packet and, in response, may queue the at least one packet in queue 1522b.

The switch circuitry may be additionally configured to egress the at least one packet in the respective time window from the second port. Thus, for example, switch circuitry 1520 may egress the at least one packet via port 1510b in the respective time window for port 1510b. In some embodiments, the at least one packet may include two or more packets. In such embodiments, the respective time window of the determine egress period may be specified to allow the egress of one of the two or more packets. In certain embodiments where the at least one packet may include two or more packets, specifying the respective time window of the determined egress may include determining a quantity of the two or more packets to egress each egress period and configuring the respective time window to allow the egress of the quantity each egress period. In some embodiments, where two or more ports of the network switch may be configured to couple to respective real time networks, packets for each of the two or ports may be scheduled to egress concurrently, thus allowing two or more real time networks to receive packets concurrently.

Figure 16:
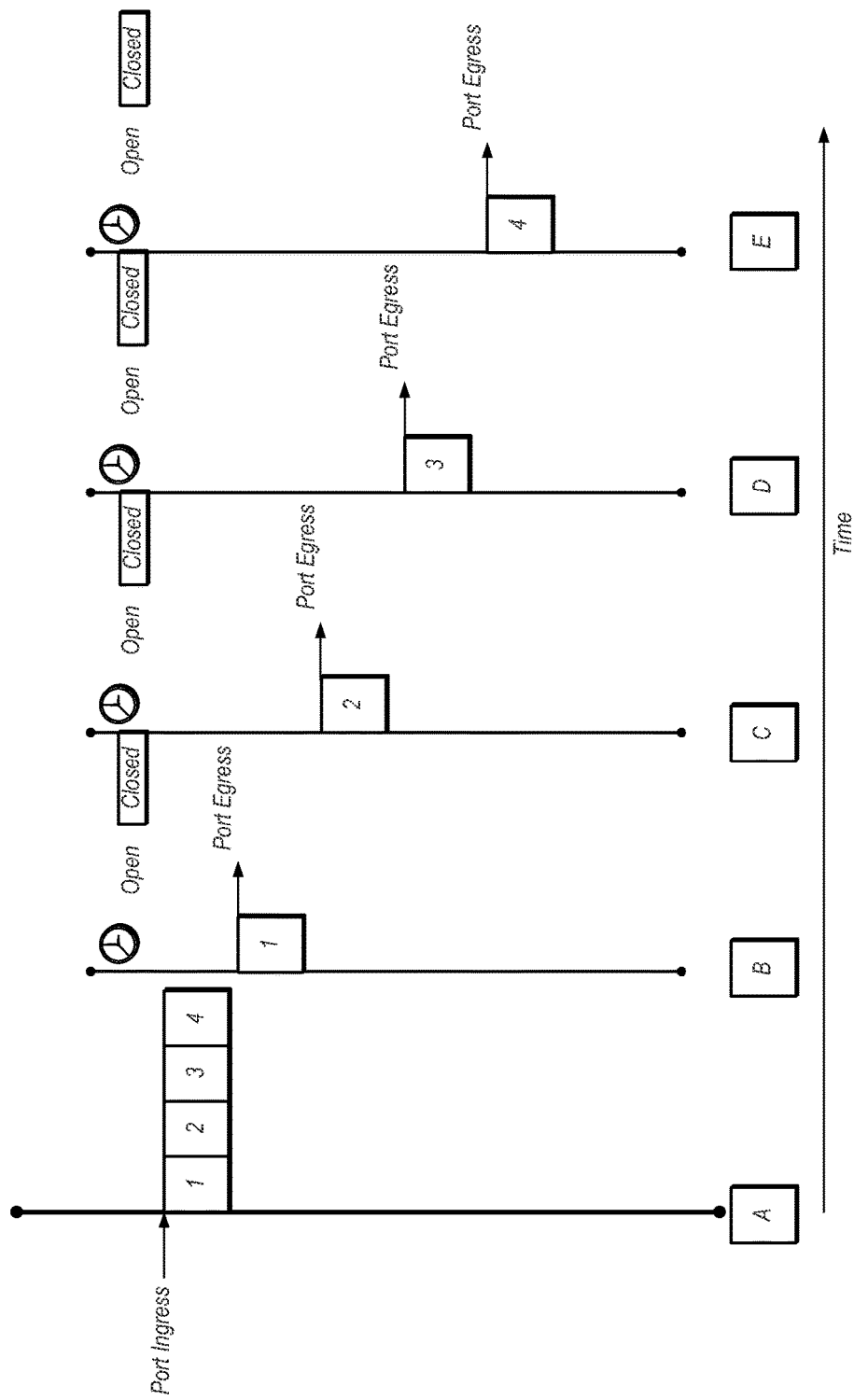
FIG. 16 is an illustration of a time-based scheduled egress from a real-time network switch according to one embodiment.

FIG. 16: Illustration of a Time-Based Scheduled Egress from a Network Switch

FIG. 16 is an illustration of an exemplary schedule for a time-based data egress from a network switch, such as network switch 1500. At time A, packets 1-4 may be asynchronously ingressed to the network switch and queued as described above. For simplification, it is assumed that all packets egressed at time A are of the same packet type and same destination address. Additionally, for simplicity, it is assumed that the egress period is specified such that a single packet egresses each egress period. Then, at time B, packet 1 is dequeued and egressed. During the egress of packet 1, the "window of time" is "open", allowing the packet to be egressed. Then, after a specified duration, the "window of time" is "closed" and the switch waits for the next egress period to begin. At time C, packet 2 is dequeued and egressed. Similarly, at times D and E, packets 3 and 4, respectively, are dequeued and egressed. In such a manner, packets received asynchronously at the network may be egressed on a time-based schedule.

Figure 17:
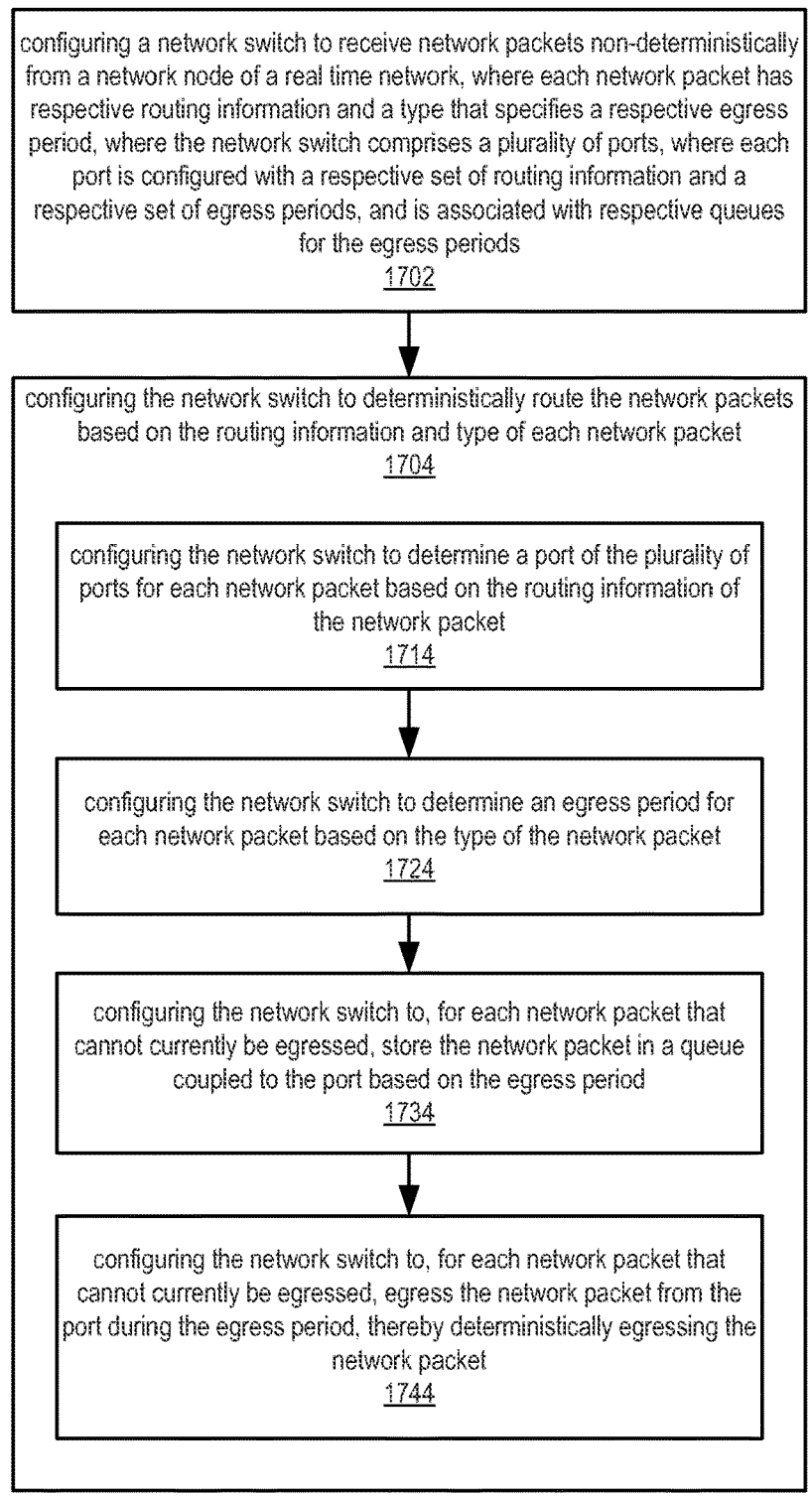
FIG. 17 is a flowchart diagram illustrating a method for configuring scheduled data egress from a network switch according to one embodiment.
Figure 18:
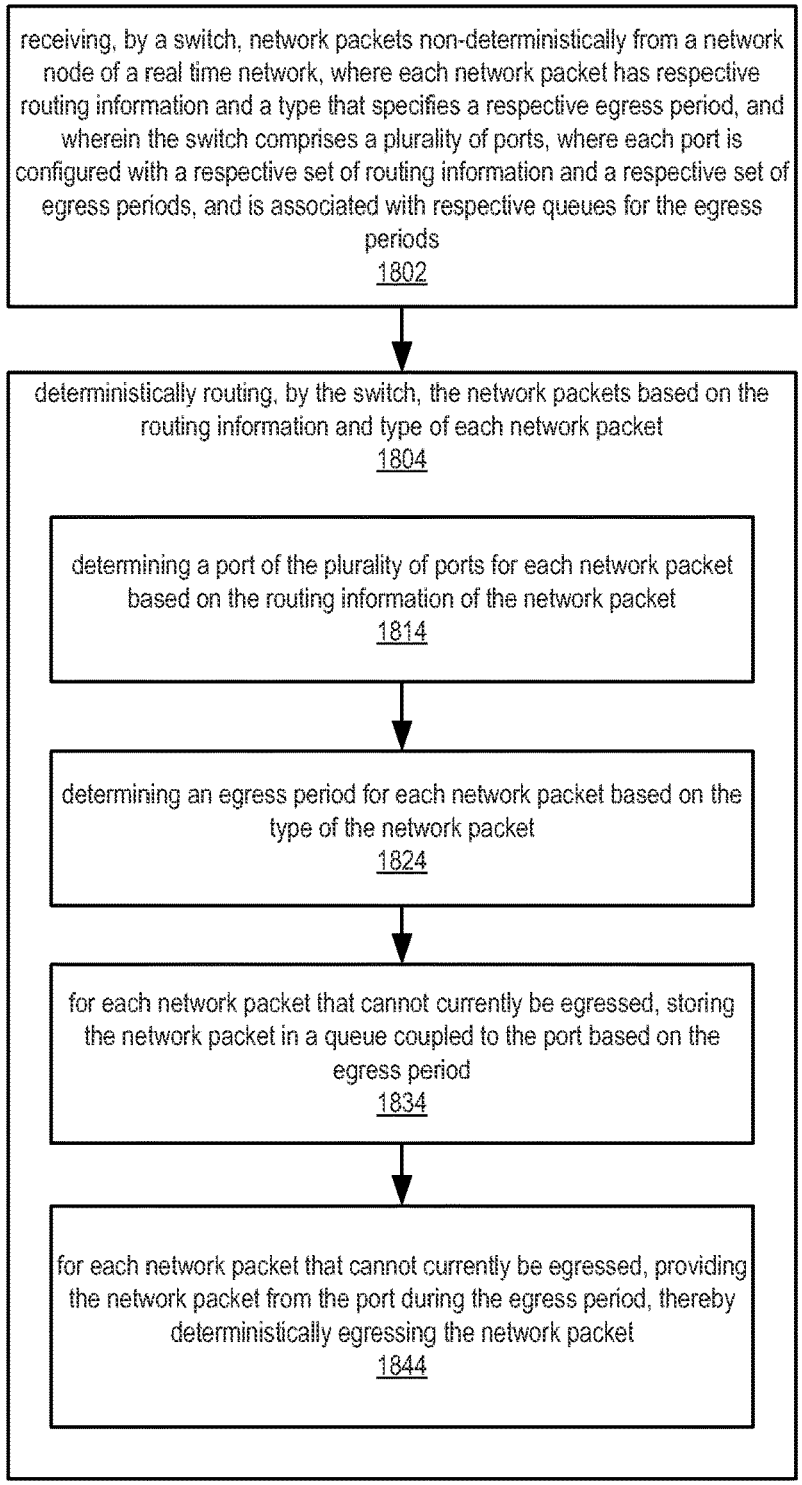
FIG. 18 is a flowchart diagram illustrating a method for scheduled data egress from a network switch according to one embodiment.

FIGS. 17 and 18: Flowcharts of Methods for Scheduled Data Egress

FIGS. 17 and 18 illustrate methods for scheduled data egress, according to some embodiments. The methods shown in FIGS. 17 and 18 may be used in conjunction with any of the methods, systems or devices shown in any of the Figures described herein, among other devices. In various embodiments, some of the method elements shown may be performed concurrently, in a different order than shown, or may be omitted. Additional method elements may also be performed as desired. As shown, the method illustrated in FIG. 17 may operate as follows.

In 1702, a network switch may be configured to receive network packets non-deterministically from a network node of a real time network. Each network packet may have respective routing information and a type that may specify a respective egress period. The network switch may include a plurality of ports and each port may be configured with a respective set of routing information and a respective set of egress periods. Additionally, each port may be associated with respective queues for the egress periods.

In 1704, the network switch may be configured to deterministically route the network packets based on the routing information and type of each network packet. The configuration of the network switch may include the following method elements.

In 1714, the network switch may be configured to determine a port of the plurality of ports for each network packet based on the routing information of the network packet.

In 1724, the network switch may be configured to determine an egress period for each network packet based on the type of the network packet.

In 1734, the network switch may be configured to, for each network packet that cannot currently be egressed, store the network packet in a queue coupled to the port based on the egress period.

In 1744, the network switch may be configured to, for each network packet that cannot currently be egressed, egress the network packet from the port during the egress period. Hence, the network switch may be configured to deterministically egress the network packet.

In further embodiments of the method, the network switch may receive one or more packets asynchronously from a network node via a first port and determine a second port of a plurality of ports for egressing at least one of the one or more the packets based on the destination address of the at least one packet. Additionally, the network switch may determine an egress period for egressing the at least one packet based on the type of the at least one packet and determine that the at least one packet cannot currently be egressed from the second port. Also, the switch circuitry may queue the at least one packet in a first queue of the plurality of queues based on the respective packet type and destination address in response to determining that the at least one packet cannot currently be egressed, where the first queue is associated with the second port. Accordingly, the at least one packet may be egressed in the respective time window from the second port.

In certain embodiments of the method, the network switch, in order to determine that the at least one packet cannot currently be egressed, may determine that a respective time window for egress of the at least one packet is closed, determine that there is already a queued packet of the same type queued in the first queue for egress from the second port, or determine that the second port is currently egressing a packet.

In other embodiments of the method, the packet may include two or more packets. In such embodiments, the respective time window of the determined egress period may be specified to allow the egress of one of the two or more packets. Alternatively, specifying the respective time window of the determined egress may include the switch circuitry determining a quantity of the two or more packets to egress each egress period and configuring the respective time window to allow the egress of the quantity each egress period.

Further, as illustrated in FIG. 18, a switch may perform a method for egressing packets (e.g., network packets) as follows.

In 1802, a network switch may receive network packets non-deterministically from a network node of a real time network. Each network packet may have respective routing information and a type that may specify a respective egress period. The network switch may include a plurality of ports and each port may be configured with a respective set of routing information and a respective set of egress periods. Additionally, each port may be associated with respective queues for the egress periods.

In 1804, the network switch may deterministically route the network packets based on the routing information and type of each network packet. The deterministic routing of the network switch may include the following method elements.

In 1814, the network switch may determine a port of the plurality of ports for each network packet based on the routing information of the network packet.

In 1824, the network switch may determine an egress period for each network packet based on the type of the network packet.

In 1834, the network switch may, for each network packet that cannot currently be egressed, store the network packet in a queue coupled to the port based on the egress period.

In 1844, the network switch may, for each network packet that cannot currently be egressed, egress the network packet from the port during the egress period. Hence, the network switch may deterministically egress the network packet.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A system for interoperating between a first real time network and one or more second real time networks, the system comprising:
a plurality of ports, comprising:
at least one port coupled to the first real time network, wherein the first real time network carries first traffic comprising best effort traffic and first real time traffic; and
one or more ports coupled respectively to the one or more second real time networks, wherein each of the one or more second real time networks carries second traffic comprising only second real time traffic, and wherein the first real time network and the one or more second real time networks operate according to different protocols; and switch circuitry, coupled to the plurality of ports, wherein the switch circuitry is configured with a mapping that specifies data routing between the plurality of ports;

wherein the switch circuitry is configured to route packets between the first real time network and the one or more second real time networks based on the mapping, thereby maintaining real time behavior between the first real time traffic and the second real time traffic, wherein the switch circuitry inserts routing information in packets routed from the one or more second real time networks to the first real time network, and wherein the switch circuitry removes routing information from the packets routed from the first real time network to the one or more second real time networks;

wherein the switch circuitry is configured to route packets to distinct queues for the first traffic and the second traffic for processing by an application executing on at least one device and time stamp ingress and egress of packets to/from the first queue pairs and the one or more second queue pairs, wherein said routing of the packets to the distinct queues is performed based on the mapping, wherein the distinct queues comprise first queue pairs associated with first traffic and one or more second queue pairs associated with second traffic, and wherein the application correlates clock synchronization information of the first real time network and one or more second real time networks based on the time stamps.

2. The system of claim 1, wherein the switch circuitry further comprises:
one or more functional units, configured to perform said routing packets between the first real time network and the one or more second real time networks, and said routing packets to distinct queues.

3. The system of claim 2, wherein at least one of the one or more functional units is comprised in a network switch.

4. The system of claim 3, wherein at least one other of the one or more functional units is comprised in the at least one device.

5. The system of claim 4, wherein a network node comprises:
the network switch; and
the at least one device.

6. The system of claim 5, wherein the network node is configured as a bridge between the first real time network and at least one of the one or more second real time networks.

7. A method for configuring interoperability between a first real time network and one or more second real time networks, wherein the first real time network carries first traffic comprising best effort traffic and first real time traffic, and wherein the one or more second real time networks carry only second real time traffic, the method comprising:
configuring a network switch, comprising a plurality of ports and switch circuitry coupled to the plurality of ports, wherein said configuring comprises:
configuring one or more ports of the plurality of ports to respectively couple to one of the one or more second real time networks, wherein the first real time network and the one or more second real time networks operate according to different protocols; and
configuring at least one port of the plurality of ports to couple to the first real time network; and
configuring the switch circuitry with a mapping that specifies data routing between the plurality of ports; and configuring the switch circuitry to:
route packets between the first real time network and the one or more second real time networks based on the mapping, thereby maintaining real time behavior between the first real time traffic and the second real time traffic;
insert routing information in packets routed from the one or more second real time networks to the first real time network;
remove routing information from the packets routed from the first real time network to the one or more second real time networks; and
route packets to distinct queues for the first traffic and the second traffic for processing by an application executing on at least one device and time stamp ingress and egress of packets to/from the first queue pairs and the one or more second queue pairs, wherein said routing of the packets to the distinct queues is performed based on the mapping, wherein the distinct queues comprise first queue pairs associated with first traffic and one or more second queue pairs associated with second traffic, and wherein the application correlates clock synchronization information of the first real time network and one or more second real time networks based on the time stamps.

8. The method of claim 7, wherein the switch circuitry comprises one or more functional units, configured to perform said routing packets between the first real time network and the one or more second real time networks, said inserting routing information, said removing routing information, and said routing packets to distinct queues.

9. The method of claim 8, wherein a network node comprises the network switch.

10. The method of claim 9, further comprising:
configuring the network node as a bridge between the first real time network and at least one of the one or more second real time networks.

11. A method for interoperating between a first real time network and one or more second real time networks, wherein the first real time network carries first traffic comprising best effort traffic and first real time traffic, and wherein the one or more second real time networks carry only second real time traffic, the method comprising:
routing packets between the first real time network and the one or more second real time networks based on a mapping that specifies said routing, thereby maintaining real time behavior between the first real time traffic and the second real time traffic, wherein the first real time network and the one or more second real time networks operate according to different protocols;
inserting routing information in packets routed from the one or more second real time networks to the first real time network;
removing routing information from the packets routed from the first real time network to the one or more second real time networks; and
routing packets to distinct queues for the first traffic and the second traffic for processing by an application executing on at least one device and time stamp ingress and egress of packets to/from the first queue pairs and the one or more second queue pairs, wherein said routing of the packets to the distinct queues is performed based on the mapping, wherein the distinct queues comprise first queue pairs associated with first traffic and one or more second queue pairs associated with second traffic, and wherein the application correlates clock synchronization information of the first real time network and one or more second real time networks based on the time stamps.

12. The method of claim 11, wherein one or more functional units perform said routing packets between the first real time network and the one or more second real time networks, said inserting routing information, said removing routing information, and said routing packets to distinct queues.

13. A system for interoperating between a first real time network and one or more second real time networks, the system comprising:
   a network switch, comprising:
      at least one port coupled to the first real time network, wherein the first real time network carries first traffic comprising best effort traffic and first real time traffic; and
      one or more ports coupled respectively to the one or more second real time networks, wherein each of the one or more second real time networks carries second traffic comprising only second real time traffic, and wherein the first real time network and the one or more second real time networks operate according to different protocols; and
      switch circuitry, coupled to the ports, wherein the switch circuitry is configured with a mapping that specifies data routing between the ports;
   wherein the switch circuitry is configured to route packets between the first real time network and the one or more second real time networks based on the mapping, thereby maintaining real time behavior between the first real time traffic and the second real time traffic, wherein the switch circuitry inserts routing information in packets routed from the one or more second real time networks to the first real time network, and wherein the switch circuitry removes routing information from the packets routed from the first real time network to the one or more second real time networks; and
   a first device coupled to the switch, wherein an application executes on the first device, wherein the first device comprises at least two first queue pairs for the first traffic and one or more respective second queue pairs for the second traffic for the one or more second real time networks, wherein the first device is configured to time stamp ingress and egress of packets to/from the first queues and the second queues, and wherein the application correlates clock synchronization information of the first real time network and one or more second real time networks based on the time stamps;
   wherein the switch circuitry is configured to route packets to one or more queues of the first queue pairs and to one or more queues of the respective second queue pairs for processing by the application executing on the first device based on the mapping.

14. The system of claim 13, wherein the switch circuitry further comprises:
   one or more functional units, configured to perform said routing packets between the first real time network and the one or more second real time networks, said inserting routing information, said removing routing information, and said routing packets to distinct queues.

15. The system of claim 13, wherein a network node comprises:
   the network switch; and
   the first device.

16. The system of claim 15, wherein the network node is configured as a bridge between the first real time network and at least one of the one or more second real time networks.

17. The method of claim 12, wherein at least one of the one or more functional units is comprised in a network switch.

18. The method of claim 17, wherein at least one other of the one or more functional units is comprised in the at least one device.

19. The method of claim 18, wherein a network node comprises the network switch and the at least one device.

20. The method of claim 19, wherein the network node is configured as a bridge between the first real time network and at least one of the one or more second real time networks.

* * * * *